United States Patent
Finn et al.

(10) Patent No.: US 10,328,529 B2
(45) Date of Patent: Jun. 25, 2019

(54) LASER SCAN SEQUENCING AND DIRECTION WITH RESPECT TO GAS FLOW

(71) Applicant: ELECTRO SCIENTIFIC INDUSTRIES, INC., Portland, OR (US)

(72) Inventors: Daragh Finn, Beaverton, OR (US); Robert A. Ferguson, Aloha, OR (US)

(73) Assignee: ELECTRO SCIENTIFIC INDUSTRIES, INC, Portland, OR (US)

( * ) Notice: Subject to any disclaimer, the term of this patent is extended or adjusted under 35 U.S.C. 154(b) by 315 days.

(21) Appl. No.: 15/233,364

(22) Filed: Aug. 10, 2016

(65) Prior Publication Data

US 2017/0057016 A1 Mar. 2, 2017

Related U.S. Application Data

(60) Provisional application No. 62/210,193, filed on Aug. 26, 2015.

(51) Int. Cl.
| | |
|---|---|
| B23K 26/38 | (2014.01) |
| B23K 26/10 | (2006.01) |
| B23K 26/14 | (2014.01) |
| B23K 26/53 | (2014.01) |
| B23K 26/142 | (2014.01) |
| B23K 26/382 | (2014.01) |
| B23K 26/361 | (2014.01) |
| B23K 103/00 | (2006.01) |

(52) U.S. Cl.
CPC ............ *B23K 26/53* (2015.10); *B23K 26/142* (2015.10); *B23K 26/361* (2015.10); *B23K 26/382* (2015.10); *B23K 2103/56* (2018.08)

(58) Field of Classification Search
CPC ......... B23K 26/38; B23K 26/10; B23K 26/14
USPC ........... 219/121.68, 121.69, 121.84; 438/463
See application file for complete search history.

(56) References Cited

U.S. PATENT DOCUMENTS

| | | | |
|---|---|---|---|
| 3,626,141 | A | 12/1971 | Daly |
| 4,027,137 | A | 5/1977 | Liedtke |
| 4,303,824 | A | 12/1981 | Morgan et al. |
| 4,734,550 | A | 3/1988 | Imamura et al. |
| 5,925,024 | A | 7/1999 | Joffe |

(Continued)

FOREIGN PATENT DOCUMENTS

| | | |
|---|---|---|
| CN | 103978308 A | 8/2014 |
| GB | 2433459 B | 6/2007 |

(Continued)

OTHER PUBLICATIONS

International Search Report dated Oct. 12, 2016 concerning PCT Application No. PCT/US2016/046327, which corresponds with subject U.S. Appl. No. 15/233,364. 2 pages.

(Continued)

*Primary Examiner* — Samuel M Heinrich

(57) ABSTRACT

Employing laser scanning directions (20) that are oblique to and against a predominant gas flow direction (25) equalize the quality and waviness characteristics of orthogonal scribe lines (26) made by the laser scans. Positioning and sequence of multiple scan passes to form a feature wider than the width of a scribe line (26) can be controlled to enhance quality and waviness characteristics of the edges of the feature.

20 Claims, 21 Drawing Sheets

(56) References Cited

U.S. PATENT DOCUMENTS

| | | |
|---|---|---|
| 6,204,475 B1 | 3/2001 | Nakata et al. |
| 6,420,245 B1 | 7/2002 | Manor |
| 6,507,000 B2 | 1/2003 | Otsubo et al. |
| 6,531,682 B1 | 3/2003 | Guttler |
| 6,586,707 B2 | 7/2003 | Boyle et al. |
| 6,649,866 B2 | 11/2003 | Reichmann et al. |
| 6,710,294 B2 | 3/2004 | Lawson |
| 6,841,482 B2 | 1/2005 | Boyle |
| 6,969,822 B2 | 11/2005 | Pollard |
| 7,022,941 B2 | 4/2006 | Joseph et al. |
| 7,038,164 B2 | 5/2006 | Denney et al. |
| 7,220,938 B2 | 5/2007 | Tian |
| 7,302,309 B2 | 11/2007 | Scott et al. |
| 7,468,310 B2 * | 12/2008 | Yamazaki ............... H01L 21/78 438/463 |
| 7,622,000 B2 | 11/2009 | Koga et al. |
| 7,692,115 B2 | 4/2010 | Sasaki et al. |
| 7,772,090 B2 | 8/2010 | Starkston |
| 7,887,712 B2 | 2/2011 | Boyle et al. |
| 7,947,575 B2 | 5/2011 | Dunne et al. |
| 7,947,919 B2 | 5/2011 | Sukhman et al. |
| RE43,400 E | 5/2012 | O'Brien et al. |
| 8,283,596 B2 * | 10/2012 | Murase ............. B23K 26/0732 219/121.84 |
| 8,344,285 B2 | 1/2013 | Sykes et al. |
| 8,364,304 B2 | 1/2013 | Starkston et al. |
| 8,383,984 B2 | 2/2013 | Osako et al. |
| 8,778,799 B2 | 7/2014 | Souter |
| 8,809,732 B2 | 8/2014 | Sykes et al. |
| 9,259,802 B2 | 2/2016 | Willey et al. |
| 2001/0031564 A1 | 10/2001 | Suzuki et al. |
| 2004/0226927 A1 | 11/2004 | Morikazu et al. |
| 2009/0107966 A1 | 4/2009 | Wojcik et al. |
| 2011/0029124 A1 | 2/2011 | Boyle et al. |
| 2014/0026351 A1 | 1/2014 | Willey et al. |
| 2014/0312013 A1 | 10/2014 | Frankel et al. |
| 2016/0101483 A1 * | 4/2016 | Kawada ............... B23K 26/242 219/121.63 |

FOREIGN PATENT DOCUMENTS

| | | | |
|---|---|---|---|
| JP | 02002292484 A * | 10/2002 | ............ B23K 26/14 |
| JP | 2005177786 A | 7/2005 | |
| JP | 2005294636 A | 10/2005 | |
| JP | 2006128489 A | 5/2006 | |
| JP | 2011092967 A1 | 5/2013 | |
| JP | 05355349 B2 | 11/2013 | |
| KR | 2012108896 A | 10/2012 | |
| WO | WO2013/189605 A2 | 12/2013 | |

OTHER PUBLICATIONS

Written Opinion dated Oct. 12, 2016 concerning PCT Application No. PCT/US2016/046327, which corresponds with subject U.S. Appl. No. 15/233,364. 4 pages.

* cited by examiner

Arithmetic mean roughness (for a roughness curve)

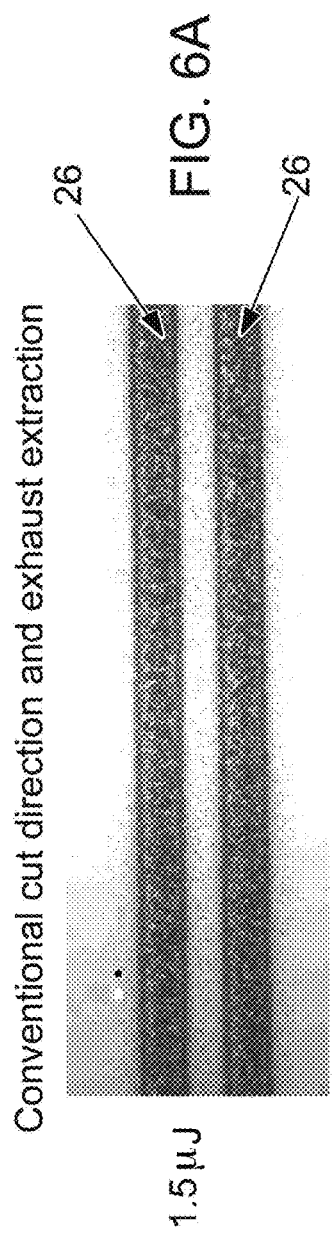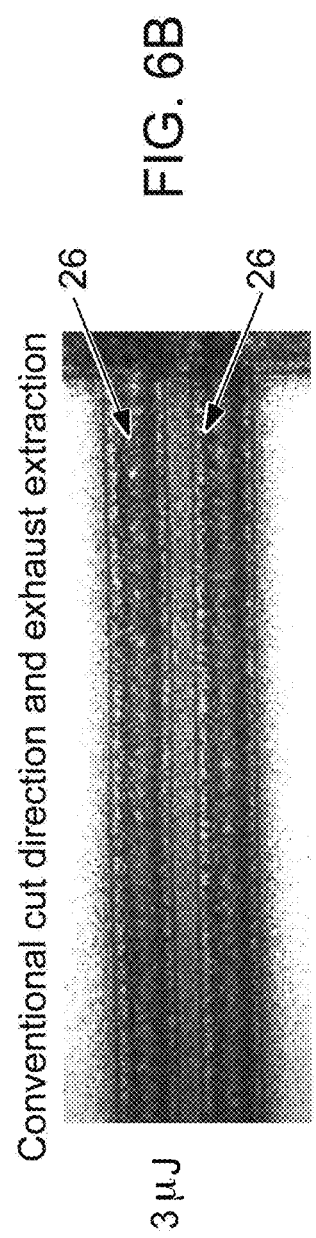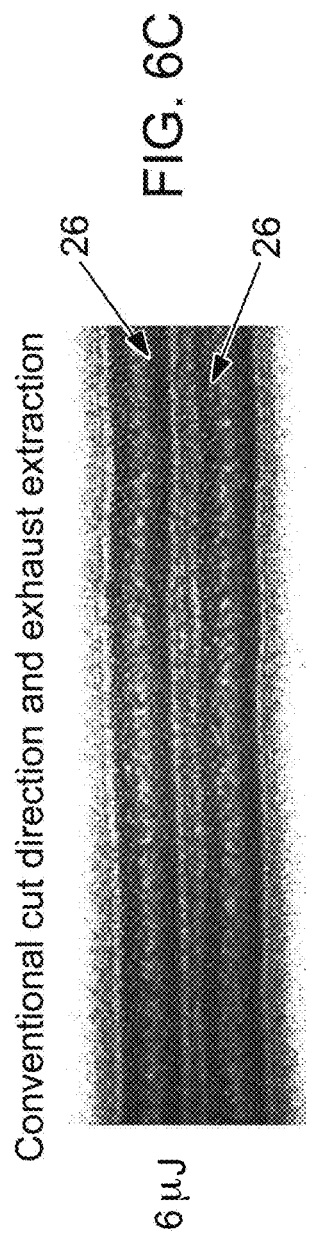

Qualitative exhaust/air vs wobble

| Substrate | Energy | Direction | Cut orientation | Air | Exhaust | Wobble(1-5) |
|---|---|---|---|---|---|---|
| Si | 1.5 | Default | 0 | 20 | On | 1 |
| Si | 1.5 | Opposite | 0 | 20 | On | 1 |
| Si | 1.5 | Default | 45 | 20 | On | 1 |
| Si | 3 | Default | 0 | 20 | On | 2 |
| Si | 6 | Default | 0 | 20 | On | 4 |
| Si | 6 | Opposite | 45 | 20 | On | 3 |
| Si | 6 | Opposite | 0 | 20 | On | 5 |
| Si | 6 | Default | 0 | 20 | Off | 4 |
| Si | 6 | Default | 45 | 20 | Off | 2 |
| Si | 6 | Default | 0 | 0 | Off | 4 |
| Si | 6 | Default | 45 | Off | Off | 2 |

FIG. 8

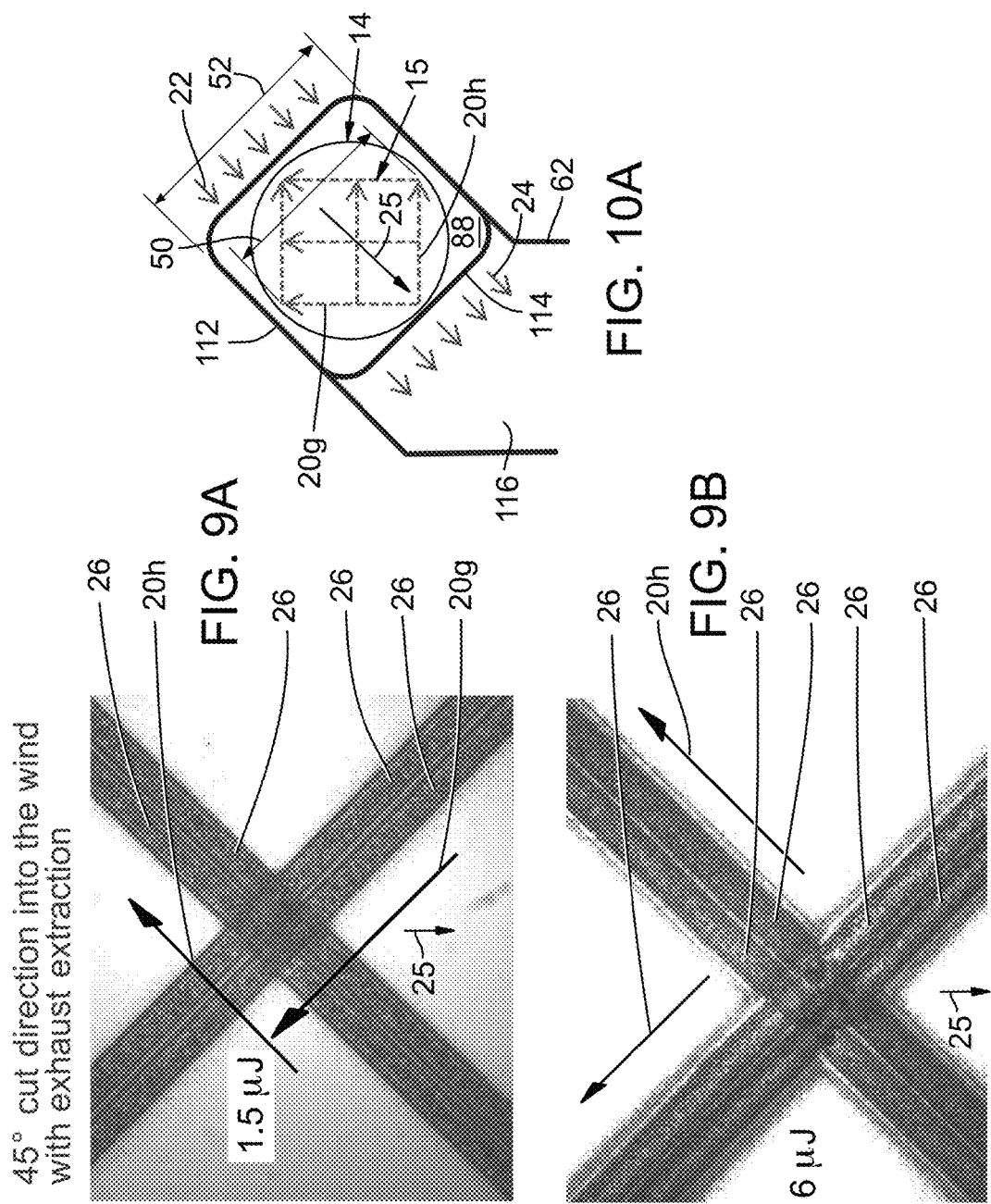

Conventional Street Orintation on Stage

Field sequencing starts at bottom right and cut from bottom to top and right to left

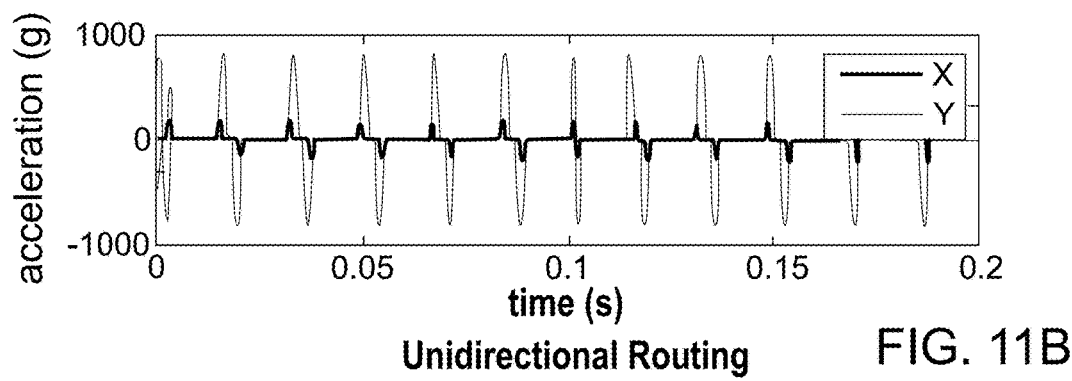
FIG. 11B Unidirectional Routing
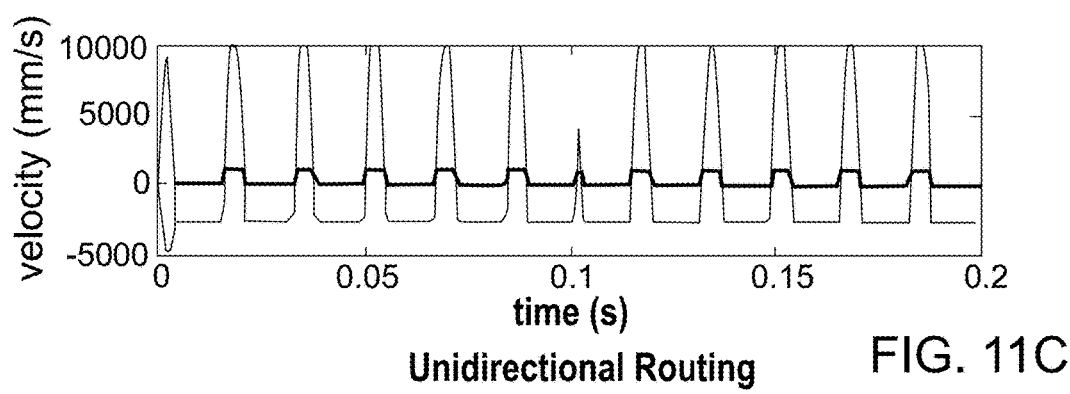
FIG. 11C Unidirectional Routing
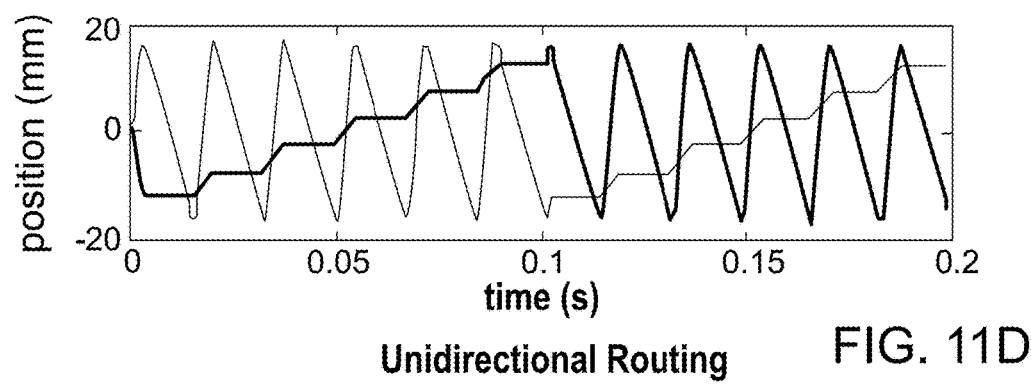
FIG. 11D Unidirectional Routing Alternative Street Orientation on Stage
Mount wafer at 45° and
Use defalt gas flow direction Field sequencing
starts at bottom left and
cuts from bottom to
top and left to right

Scan Sequence

In to out
7 lines cut order

Out to in
7 lines cut order

LASER SCAN SEQUENCING AND DIRECTION WITH RESPECT TO GAS FLOW

CROSS REFERENCE TO RELATED APPLICATION

This application is a non-provisional application of U.S. Provisional Patent Application No. 62/210,193, which was filed on Aug. 26, 2015, the contents of which are herein incorporated by reference in their entirety for all purposes.

COPYRIGHT NOTICE

®2016 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application relates to systems and methods for laser scanning and, in particular, to systems and methods for control of laser scan direction with respect to direction of gas flow or with respect to scan sequencing.

BACKGROUND

Most semiconductor and related products, such as transistors, diodes, light emitting diodes, MEMS devices, planar waveguide structures, and integrated circuits, are fabricated in the form of a large number of elements manufactured simultaneously on a large workpiece, such as a wafer. This wafer is typically composed of Si, GaAs, GaP, InP, sapphire, or other material, or combinations thereof. The creation of devices is most often performed using conventional fabrication techniques such as photolithography, oxidation, implantation, deposition, etching, epitaxial growth, and/or spin coating. Upon completion of these device-laden wafers, the individual devices must be singulated, a process which is typically referred to as "dicing." The individual devices are referred to as "die" or "dice." The area on the wafer in between active parts of adjacent die is referred to as the "street" or "dice lane." The streets are limited to a minimum street width because of the wafer material that is removed or destroyed during the dicing process. The wafer area that is completely removed by the dicing process can be called a "cut area" or "kerf," while the rest of the street must accommodate any damage zone around the cut area and any misalignment or deviation from straightness of the cut.

Historically, dicing has been performed by the use of a wafer saw or by the technique of "scribe and break," where the wafer is notched, often by a diamond point, and is then cleaved along this scribe line. Due to issues with scribe and break such as low yield, dicing saws became the predominant tool for dicing wafers. Conventional slicing blades typically have a narrow dimension of about 50 to 200 µm along their cutting axes and produce cuts that are wider than the blades. The slicing blades currently need to be this wide to withstand stresses of making straight cuts through the strength and thickness of conventional wafers, for example. The wide cuts made by the mechanical cutting blades significantly reduce the number of rows and columns of die that can be fit onto each wafer.

Desire to reduce the cut area led to the exploration of the use of lasers in the dicing process. Lasers offered the potential of the smallest street width available, due to a potentially very small kerf width and the possibility of accurate alignment of the laser to the workpiece. Thus, laser sawing was an attractive alternative to the conventional techniques for dicing. However, laser separation of the wafer material was much slower than done by blade so the street size generally remained large enough to accommodate the width of dicing blades, which could be used as a second step after laser scribe lines were formed. A number of these hybrid laser and dice blade processes were developed; however, the street width still remained relatively large. U.S. Pat. No. RE 43,400 discusses the advantages of employing lasers to separate device-laden workpieces.

Advances in laser parameters and processing techniques have reduced the throughput time and cost of separating the wafer material without the use of mechanical saws, such as the dice blades. Nevertheless, laser-dicing processes can be further improved.

SUMMARY

This summary is provided to introduce a selection of concepts in a simplified form that are further described in greater detail later. This summary is not intended to identify key or essential inventive concepts of the claimed subject matter, nor is it intended for determining the scope of the claimed subject matter.

In some embodiments, a method for enhancing an edge characteristic of a laser-induced material effect resulting from transverse laser scans across a workpiece, comprises: relatively orienting a laser processing field and the workpiece at a processing station of a laser processing system; establishing, from a gas supply, a gas input flow in a gas input direction across at least a portion of a major surface of the workpiece, wherein gas in the gas input flow has a positive gas input velocity in the gas input direction; establishing, from a vacuum source, a gas outtake flow in a gas outtake direction across at least the portion of the major surface of the workpiece, wherein the gas input flow and the gas outtake flow establish a cumulative or predominant gas flow direction across the major surface of the workpiece, and wherein the gas input flow and the gas outtake flow cooperate to provide cumulative gas flow characteristics across the major surface of the workpiece; scanning a laser beam in a first laser scan direction of relative movement of a laser beam processing axis of the laser beam with respect to the workpiece, wherein the laser beam impinges the workpiece along the first laser scan direction affecting the material along the first laser scan direction that is obliquely oriented opposite to the cumulative or predominant gas flow direction; and scanning the same laser beam or a different laser beam in a second laser scan direction of relative movement of a respective laser beam processing axis with respect to the workpiece, wherein the laser beam impinges the workpiece along the second laser scan direction affecting the material along the second laser scan direction that is obliquely oriented opposite to the cumulative or predominant gas flow direction, wherein the second laser scan direction is transverse to the first laser scan direction.

In some additional, cumulative, or alternative embodiments, a method for enhancing an edge characteristic of a laser-induced material effect resulting from transverse laser scans across a workpiece, comprises: relatively orienting a laser processing field and the workpiece at a processing station of a laser processing system; establishing, from a gas supply, a gas input flow in a gas input direction across at least a portion of a major surface of the workpiece, wherein gas in the gas input flow has a positive gas input velocity in the gas input direction; establishing, from a vacuum source, a gas outtake flow in a gas outtake direction across at least the portion of the major surface of the workpiece, wherein the gas input flow and the gas outtake flow establish a cumulative or predominant gas flow direction across at least the portion of the major surface of the workpiece, and wherein the gas input flow and the gas outtake flow cooperate to provide cumulative gas flow characteristics across at least the portion of the major surface of the workpiece; scanning a laser beam in a first laser scan direction of relative movement of a laser beam processing axis of the laser beam with respect to the workpiece, wherein the laser beam impinges the workpiece along the first laser scan direction affecting the material along the first laser scan direction that is obliquely oriented opposite to the cumulative or predominant gas flow direction to create a first scribe line having a first waviness value; and scanning the same laser beam or a different laser beam in a second laser scan direction of relative movement of a respective laser beam processing axis with respect to the workpiece, wherein the laser beam impinges the workpiece along the second laser scan direction affecting the material along the second laser scan direction that is obliquely oriented opposite to the cumulative or predominant gas flow direction to create a second scribe line having a second waviness value, wherein the second scribe line is orthogonal to the first scribe line, and wherein the second waviness value is within 0.3 microns of the first waviness value.

In some additional, cumulative, or alternative embodiments, a method for enhancing an edge characteristic of a laser-induced material effect resulting from transverse laser scans across a workpiece, comprises: relatively orienting a laser processing field and the workpiece at a processing station of a laser processing system; establishing, from a gas supply, a gas input flow in a gas input direction across at least a portion of a major surface of the workpiece, wherein gas in the gas input flow has a positive gas input velocity in the gas input direction; establishing, from a vacuum source, a gas outtake flow in a gas outtake direction across at least the portion of the major surface of the workpiece, wherein the gas input flow and the gas outtake flow establish a cumulative or predominant gas flow direction across at least the portion of the major surface of the workpiece, and wherein the gas input flow and the gas outtake flow cooperate to provide a cumulative gas flow having a gas flow velocity across at least the portion of the workpiece; scanning a laser beam in a first laser scan direction of relative movement of a laser beam processing axis of the laser beam with respect to the workpiece, wherein the laser beam impinges the workpiece along the first laser scan direction affecting the material along the first laser scan direction and creating one or more localized adverse gas characteristics that could interfere with the capability of the laser beam to impinge the workpiece accurately with respect to a directed position of the laser beam processing axis along the first laser scan direction and could cause fluctuation of the edge characteristic of the laser-induced material effect, wherein the first laser scan direction is transverse to the cumulative or predominant gas flow direction, wherein the first laser scan direction includes a first laser scan direction component that is parallel with and opposite to the cumulative or predominant gas flow direction, and wherein the first laser scan direction with respect to the cumulative or predominant gas flow direction inhibits the one or more localized adverse gas characteristics; and scanning the same laser beam or a different laser beam in a second laser scan direction of relative movement of a respective laser beam processing axis with respect to the workpiece, wherein the laser beam impinges the workpiece along the second laser scan direction affecting the material along the second laser scan direction and creating one or more localized adverse gas characteristics that could interfere with the capability of the laser beam to impinge the workpiece accurately with respect to a directed position of the laser beam processing axis along the second laser scan direction and could cause fluctuation of the edge characteristic of the laser-induced material effect, wherein the second laser scan direction is transverse to the first laser scan direction, wherein the second laser scan direction is transverse to the cumulative or predominant gas flow direction, wherein the second laser scan direction includes a second laser scan direction component that is parallel with and opposite to the cumulative or predominant gas flow direction, and wherein the second laser scan direction with respect to the cumulative or predominant gas flow direction inhibits the one or more localized adverse gas characteristics.

In some additional, cumulative, or alternative embodiments, laser processing system for processing a workpiece which has a major surface and one or more features formed on the major surface, wherein the major surface has a surface area, and wherein the laser processing system provides a processing field having a processing field orientation with a first processing field axis and a second processing field axis that is orthogonal to the first processing field axis, comprises: a processing station having a processing station orientation with a first processing station axis and a second processing station axis that is orthogonal to the first processing station axis; a chuck adapted for placing the workpiece in the processing station at which the workpiece is positionable so that at least one of the features is oriented with respect to the processing station orientation or the processing field orientation; a laser adapted for generating a laser beam; a beam positioning system including one or more stages for supporting the chuck or the workpiece, the beam positioning system also including a fast-positioner having a scan field that is smaller than the workpiece, wherein the laser processing field is within the scan field such that the laser processing field is smaller than or equal in area to the scan field, wherein the beam positioning system is adapted for positioning the processing field in multiple neighboring locations over the workpiece, and wherein the beam positioning system is adapted for scanning the laser beam along a laser beam processing axis to impinge the workpiece; a gas flow assembly that includes a gas input flow device adapted for establishing a gas input flow having a positive gas input velocity in a gas input direction across at least the processing field located over a portion of the major surface of the workpiece, wherein the gas flow assembly also includes a gas outtake port adapted for establishing a gas outtake flow in a gas outtake direction across at least the processing field located over the portion of the major surface of the workpiece, wherein the gas input flow and the gas outtake flow are adapted to establish a predominant gas flow direction across at least the processing field located over the portion of the major surface of the workpiece, and wherein the gas input flow and the gas outtake flow are adapted to cooperate to provide cumulative gas flow characteristics across at least the processing field located over the portion of the major surface of the workpiece; and a controller adapted to control, within the processing field and while maintaining the gas input flow and the gas outtake flow, scanning the laser beam in a first laser scan direction of relative movement of a laser beam processing axis of the laser beam with respect to the workpiece, such that the first laser scan direction is obliquely oriented opposite to the predominant gas flow direction and such that the laser beam impinges the workpiece along the first laser scan direction affecting the material along the first laser scan direction, wherein the controller is also adapted to control, within the processing field and while maintaining the gas input flow and the gas outtake flow, scanning the same laser beam or a different laser beam in a second laser scan direction of relative movement of a respective laser beam processing axis with respect to the workpiece, such that the second laser scan direction is obliquely oriented opposite to the predominant gas flow direction and such that the laser beam impinges the workpiece along the second laser scan direction affecting the material along the second laser scan direction, and wherein the second laser scan direction is transverse to the first laser scan direction.

In some additional, cumulative, or alternative embodiments, the second scan direction is orthogonal to the first scan direction.

In some additional, cumulative, or alternative embodiments, the first scan direction is at a 135°±22.5° angle with respect to the predominant gas flow direction.

In some additional, cumulative, or alternative embodiments, the first scan direction is at a 135°±11.25° angle with respect to the predominant gas flow direction.

In some additional, cumulative, or alternative embodiments, the first scan direction is at a 135°±5.125° angle with respect to the predominant gas flow direction.

In some additional, cumulative, or alternative embodiments, the second scan direction is at a 225°±22.5° angle with respect to the predominant gas flow direction.

In some additional, cumulative, or alternative embodiments, the second scan direction is at a 225°±11.25° angle with respect to the predominant gas flow direction.

In some additional, cumulative, or alternative embodiments, the second scan direction is at a 225°±5.125° angle with respect to the predominant gas flow direction.

In some additional, cumulative, or alternative embodiments, the predominant gas flow direction remains generally the same during scans along the first laser scan direction and the second laser scan direction.

In some additional, cumulative, or alternative embodiments, the laser-induced material effect comprises a kerf, mark, through hole via, blind via, trench, or skive.

In some additional, cumulative, or alternative embodiments, the laser-induced material effect comprises laser ablation.

In some additional, cumulative, or alternative embodiments, the one or more localized adverse gas characteristics include one or more of: airborne debris, smoke, refractive index change, air pressure change, temperature change, and air turbulence.

In some additional, cumulative, or alternative embodiments, the predominant gas flow direction is parallel to or collinear with the first processing station axis, wherein the workpiece includes a set of streets between features, devices, or dies of the workpiece, and wherein the set of streets are aligned obliquely to the first processing station axis.

In some additional, cumulative, or alternative embodiments, the gas comprises air.

In some additional, cumulative, or alternative embodiments, the laser beam includes laser pulses having a pulse energy greater than or equal to 2 µJ.

In some additional, cumulative, or alternative embodiments, the laser beam includes laser pulses having a pulse energy greater than or equal to 6 µJ.

In some additional, cumulative, or alternative embodiments, scanning the laser beam comprises delivering laser pulses to the workpiece at a bite size of smaller than or equal to 5 µm.

In some additional, cumulative, or alternative embodiments, scanning the laser beam comprises delivering laser pulses having a spot size at the major surface of the workpiece, wherein a spot overlap between sequential laser pulses is smaller than or equal to 50% of the spot size.

In some additional, cumulative, or alternative embodiments, scanning the same or different laser beam in the second laser scan direction follows scanning the laser beam in the first scan direction within less than or equal to 0.5 seconds.

In some additional, cumulative, or alternative embodiments, the edge characteristic comprise one or more of straightness, depth, and optical density.

In some additional, cumulative, or alternative embodiments, the laser-induced material effect forms elongated scan features along the first and second laser scan directions, wherein the elongated scan features exhibit a perpendicular width having a standard deviation of less than 0.5 microns.

In some additional, cumulative, or alternative embodiments, the laser-induced material effect forms a first scan feature along the first laser scan direction, wherein the first scan feature has opposing first primary and first secondary edges, wherein the laser-induced material effect forms a second scan feature along the second laser scan direction, wherein the second scan feature has opposing second primary and second secondary edges, wherein each of the edges can be expressed as a respective average straight fit line, wherein peaks and valleys of each edge can be expressed as absolute values with respect to the respective average straight fit line, wherein a standard deviation of the absolute values of each edge to its respective average straight fit line is less than 0.3 microns.

In some additional, cumulative, or alternative embodiments, scanning the laser beam in the first laser scan direction employs one or more of: a galvanometer-driven mirror, a fast-steering mirror, a rotating polygon scanner, and an acousto-optic device.

In some additional, cumulative, or alternative embodiments, scanning the laser beam in the first laser scan direction employs one or more galvanometer-driven mirrors.

In some additional, cumulative, or alternative embodiments, the cumulative gas flow along the predominant gas flow direction is continuous.

In some additional, cumulative, or alternative embodiments, the laser beam is scanned for a scan set of multiple passes to form an elongated feature having a feature length and a feature width, wherein each pass of laser scanning to create the elongated feature scans the laser beam in the first scan direction, and wherein the laser-induced material effect of each pass of the scan set overlaps at least one of another pass of the scan set.

In some additional, cumulative, or alternative embodiments, the multiple passes include at least a first pass and a last pass, wherein the elongated scan feature has opposing elongated primary and elongated secondary edges and a midline equidistant to the elongated primary and secondary edges, wherein the first pass of the scan set is located closer to the midline than to either of the elongated primary and secondary edges, and wherein the last pass is located at one of the elongated primary and secondary edges.

In some additional, cumulative, or alternative embodiments, the multiple passes include at least a first pass and a last pass, wherein the elongated scan feature has opposing elongated primary and elongated secondary edges and a midline equidistant to the elongated primary and secondary edges, and wherein the first pass is located at one of the elongated primary and secondary edges, and wherein the last pass of the scan set is located closer to the midline than to either of the elongated primary and secondary edges.

In some additional, cumulative, or alternative embodiments, a scribe line is formed by each pass in the scan set, wherein a majority of the passes in the scan set create scribe lines that are non-overlapping with respect to temporality sequentially created scribe lines.

In some additional, cumulative, or alternative embodiments, wherein the multiple passes include as least first and second passes, and wherein the first and second passes employ different laser parameter recipes.

In some additional, cumulative, or alternative embodiments, the beam axis is in motion during the first laser scan in the first direction.

In some additional, cumulative, or alternative embodiments, the cumulative gas flow along the predominant gas flow direction is maximized with respect to flow dynamics encompassing the scan field and a velocity of scanning the laser beam in the first scan direction is maximized with respect to a parameter recipe that achieves desirable quality of the laser induced effect.

In some additional, cumulative, or alternative embodiments, the cumulative gas flow along the predominant gas flow direction travels a distance over the workpiece that is greater than half of a major axis dimension of the scan field.

In some additional, cumulative, or alternative embodiments, the laser beam processing axis has a beam position with respect to the workpiece during laser processing, and wherein the cumulative gas flow along the predominant gas flow direction travels a distance over the workpiece that is independent of the beam position with respect to the workpiece.

In some additional, cumulative, or alternative embodiments, the laser beam processing axis has a beam axis position with respect to the workpiece during laser processing, and wherein the cumulative gas flow along the predominant gas flow direction travels a distance over the workpiece that is independent of the beam axis position with respect to the workpiece.

In some additional, cumulative, or alternative embodiments, the step of scanning the laser beam in the first laser scan direction of relative movement comprises scanning the laser beam along multiple parallel scan paths in the first laser scan direction before the step of scanning the same laser beam or a different laser beam in a second laser scan direction of relative movement.

In some additional, cumulative, or alternative embodiments, the scan field has a rectangular perimeter and wherein the first scan direction is parallel to a diagonal axis of the scan field.

In some additional, cumulative, or alternative embodiments, the scan field has a major axis dimension of a major axis that bisects the scan field, wherein the gas input direction is generally perpendicular to the major axis of the scan field, wherein a gas flow volume traveling along the gas input direction has a flow width dimension that is perpendicular to the gas input direction, and wherein the flow width dimension is greater than the major axis dimension.

In some additional, cumulative, or alternative embodiments, the major axis dimension equals a diameter of the scan field or the major axis equals a diagonal axis of the scan field.

In some additional, cumulative, or alternative embodiments, laser beam impingement of the workpiece creates one or more localized adverse gas characteristics that could interfere with the capability of the laser beam to impinge the workpiece accurately with respect to a directed position of the laser beam processing axis along the first laser scan direction and could cause fluctuation of the edge characteristic of the laser-induced material effect, and wherein the first ands second laser scan directions with respect to the predominant gas flow direction inhibit the one or more localized adverse gas characteristics.

In some additional, cumulative, or alternative embodiments, the laser beam processing axis is provided with continuous motion during and between the step of scanning a laser beam in a first laser scan direction of relative movement and the step of scanning the same laser beam or a different laser beam in a second laser scan direction.

In some additional, cumulative, or alternative embodiments, the step of scanning a laser beam in a first laser scan direction of relative movement and the step of scanning the same laser beam or a different laser beam in a second laser scan direction are each performed over multiple neighboring scan fields over the workpiece while maintaining the predominant gas flow direction of the gas input flow and the gas outtake flow.

In some additional, cumulative, or alternative embodiments, the gas flow assembly is adapted to be moved in conjunction with movement of the scan field such that the predominant gas flow direction is maintained over multiple scan fields over the workpiece.

In some additional, cumulative, or alternative embodiments, the workpiece includes one or more features having a feature orientation, wherein the processing station has a first processing station orientation with a first processing station axis and a second processing station axis that is orthogonal to the first processing station axis, wherein the laser beam processing axis moves within a scan field having a scan field orientation with a first scan field axis and a second scan field axis that is orthogonal to the first scan field axis, and wherein the feature orientation is oriented with respect to the processing station orientation or the scan field orientation One of many advantages of these embodiments is that scribe lines made along the two orthogonal scan directions oblique to and against the gas flow direction exhibit similar waviness characteristics of good quality. The overall process quality is improved, facilitating straighter scribe edges, less edge waviness and wobble, uniform or equal scribe quality of the orthogonal scribe lines, steeper sidewalls or taper angle, more uniform kerf width (having lower standard deviation), improved position accuracy performance, and less noise and outliers. The more uniform kerf width, improved position accuracy, and the less noise and outliers permit more predictable smaller kerf width spans, which can allow for greater circuit density on the workpiece.

Additional aspects and advantages will be apparent from the following detailed description of exemplary embodiments, which proceeds with reference to the accompanying drawings.

BRIEF DESCRIPTION OF THE DRAWINGS

FIGS. 6A, 6B, and 6C are photomicrographs showing pairs of parallel scribe lines created in a conventional cut direction at different energies.

FIG. 8 is a table showing least amount of wobble of scribes performed with respect to several variables under other constant control conditions.

FIGS. 9A and 9B are photomicrographs showing pairs of parallel scribe lines created in an alternative scan direction at different energies.

FIG. 10A is a diagram showing an oblique processing orientation with respect to gas flow direction.

FIGS. 11B, 11C, and 11D are graphs showing exemplary respective motion profiles of acceleration, velocity, and position versus time that correspond with the simplified unidirectional scribing sequence depicted in FIG. 11A.

DETAILED DESCRIPTION OF EXEMPLARY EMBODIMENTS

Figure 1:
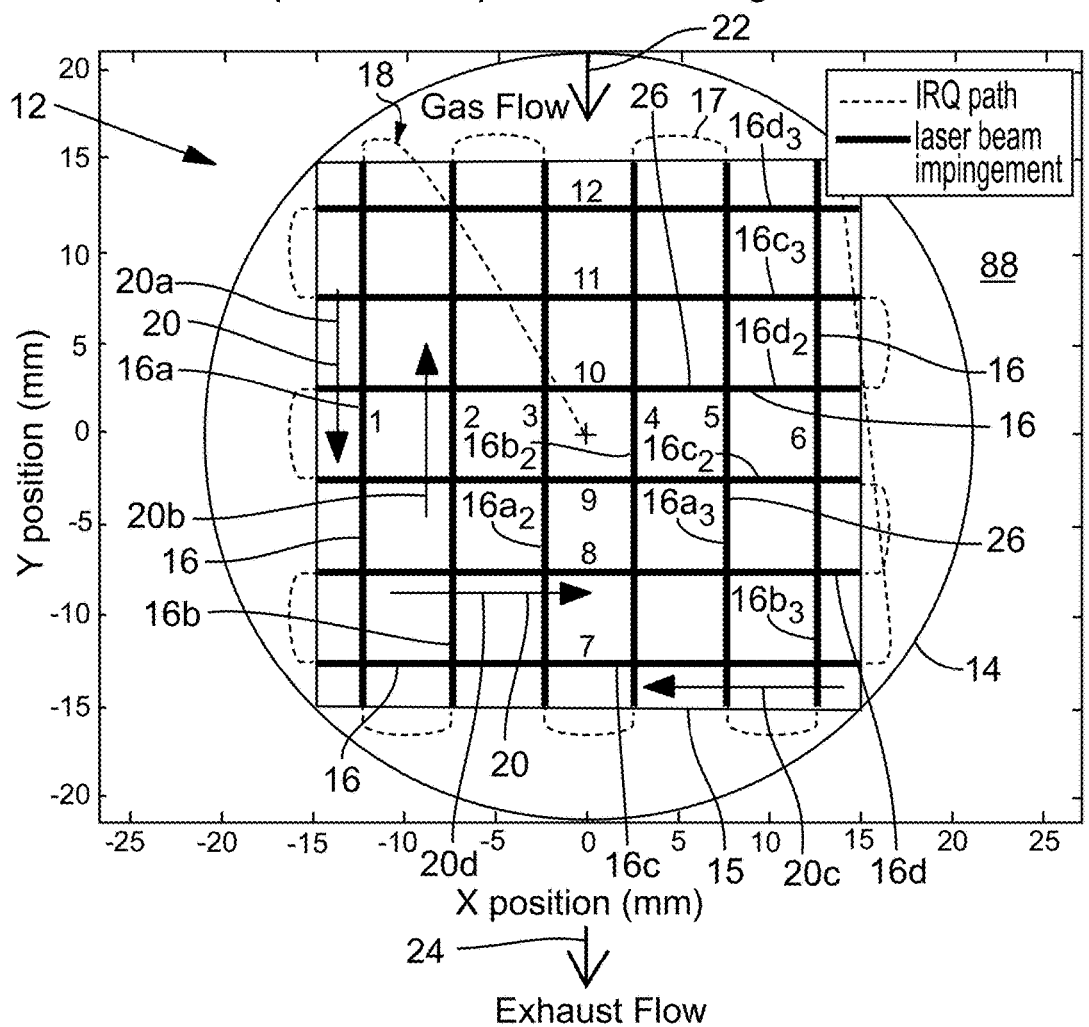
FIG. 1 is a diagram showing a simplified conventional cutting route over a workpiece.

Example embodiments are described below with reference to the accompanying drawings. Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art. In the drawings, the sizes and relative sizes of components may be disproportionate and/or exaggerated for clarity. The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween.

Figure 17:
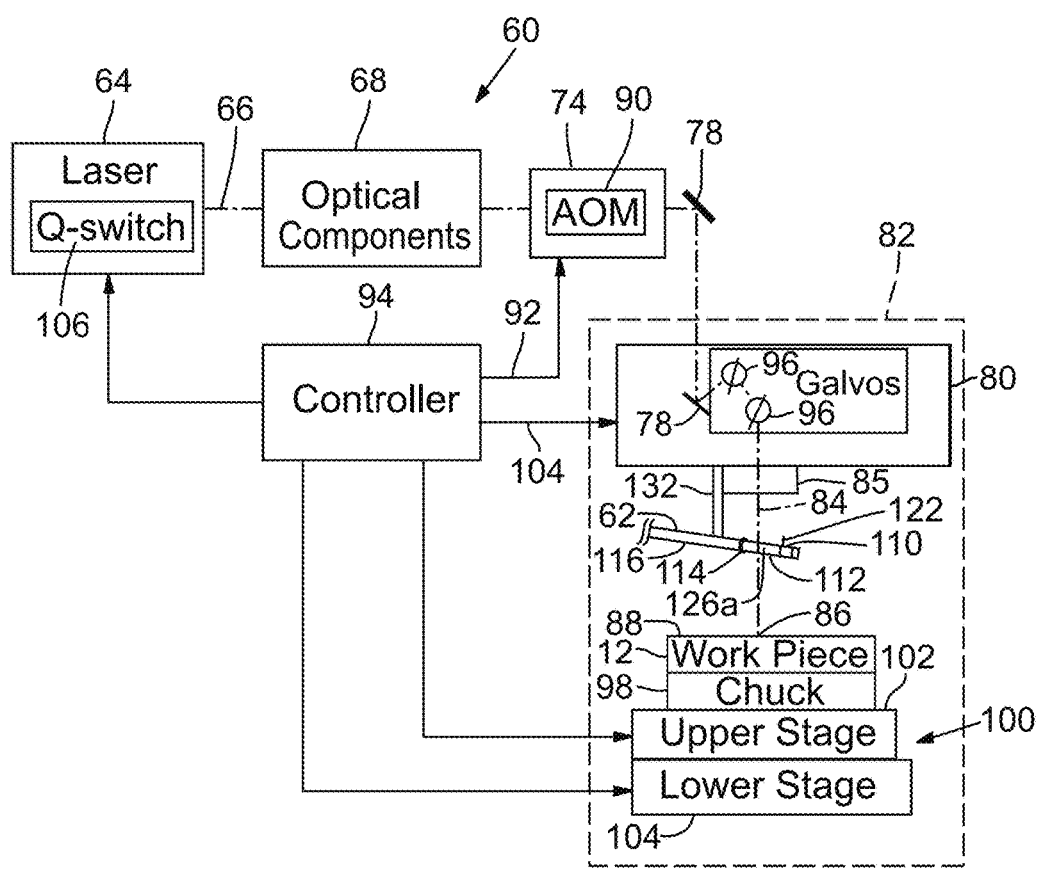
FIG. 17 is a schematic diagram of a simplified laser micromachining system employing a gas flow assembly capable of implementing cooperative gas flow and scanning techniques.

FIG. 1 is a diagram showing a simplified conventional serpentine machining route 10 over a workpiece 12, such as a circuit-laden wafer with streets, oriented with respect to a scan field 14 (or scan area 14) of a laser micromachining system 60 (FIG. 17). The workpiece 12 can be moved with respect to a fixed laser beam axis, the laser beam axis can be moved with respect to a stationary workpiece 12, or both the laser beam axis and the workpiece 12 can be moved relative to each other. Because integrated circuit (IC) devices are constructed so that they are separated by orthogonal streets (and scan paths 16), the conventional wisdom is to orient the workpiece 12 so that the scan paths 16 have a specific orientation with respect to the intended scan fields 14 of the laser micromachining system 60, such as being precisely axially aligned with X and Y axes of the scan fields 14 (and the processing fields 15).

With reference to FIG. 1, a beam axis path over a scan field 14 over workpiece 12 may include scan paths 16 (represented by heavy lines such as 16a, 16b, 16c, and 16d), in which the laser beam is impinging the workpiece 12, and non-impingement ((interrupt request (IRQ)) paths 17 (represented by dashed lines), in which the laser beam is prevented from impinging the workpiece 12 (the laser may be turned off or the laser beam may be diverted or blocked). Typically, the scan paths 16 are connected by non-impingement paths 17. The beam axis path may be scanned by one pass or multiple passes over the scan field 14, or one or more of the scan paths 16 may be selected for single or multiple passes.

Conventional sequential scans are made along spaced-apart scribe paths $16a_1$ and $16b_2$ along Y-axes in opposite scan or processing directions 20a and 20b. Additional scans are executed sequentially in opposite scan directions 20 until all of the scan paths 16 (such as $16a_2$, $16b_2$, $16a_3$, and $16b_3$) along Y-axes have been processed. After all of the scan paths 16 along Y-axes have been addressed, sequential scans are made along spaced-apart scribe paths $16c_1$ and $16d_1$ along X-axes in opposite scan or processing directions 20c and 20d. Then, additional scans are executed sequentially in opposite scan directions 20 until all of the scan paths 16 (such as $16c_2$, $16d_2$, $16c_3$, and $16d_3$) along the X-axis have been processed. These scans may be performed by one or more elements of a beam-positioning system, such as one or more galvanometer-driven mirrors 96 (e.g., a pair of galvanometers (FIG. 17)).

Although the term "scribe" can be used to express a particular laser-induced material effect, the term "scribe" and its derivatives (such as scribe line) are used herein generically to mean any laser-induced material effect (any type of laser processing) created through relative movement between a laser beam processing axis and a workpiece 12. For example, scribing can include, but is not limited to, forming a kerf, trench, skive, through hole via, blind via, or mark (at a workpiece surface or beneath the surface); trepanning; spiral processing; cutting; dicing; slicing; marking; ablating; and annealing. Moreover, in addition to laser marking or device separation applications, the techniques disclosed herein can also be used for any application where good kerf-edge characteristics would be desirable, such as resistor trimming or trenching for metallic line fills.

Similarly, the term "scanning" is used to express relative movement between a laser beam processing axis and a workpiece 12; however, the term "scanning" is also often used to express laser beam axis movement. Laser beam axis movement may employ one or more of: a galvanometer-driven mirror 96 (FIG. 17), a fast-steering mirror, a rotating polygon scanner, and an acousto-optic device. Other systems for beam axis movement may alternatively or additionally be employed. For simplification, this description proceeds predominantly (but not exclusively) herein only by way of example to beam-positioning systems 82 (FIG. 17) that move the processing beam axis and, in particular to, galvanometer-based positioning systems.

Despite consistent laser processing parameters and despite conventional pressurized gas flow in a gas flow direction 22 and vacuum pull in an exhaust capture direction 24 to address the plume of debris caused by the laser-material interaction, the applicant has verified that waviness of scribe lines 26 created by the laser scans can vary along different scan paths 16.

Conventionally, this variation has not been an issue because the street width between the devices on the workpiece 12 has remained relatively large compared to the kerf width afforded by the laser beam. However, circuit elements continue to shrink in size, and more efficient utilization of the workpiece area to increase device density and yield continues to become more desirable. So, the waviness and roughness issues identified by the applicant could limit the minimum reliable kerf width to a size large enough to accommodate the variation and could hamper efforts to further reduce or minimize the width of streets on workpieces 12.

Figure 2:
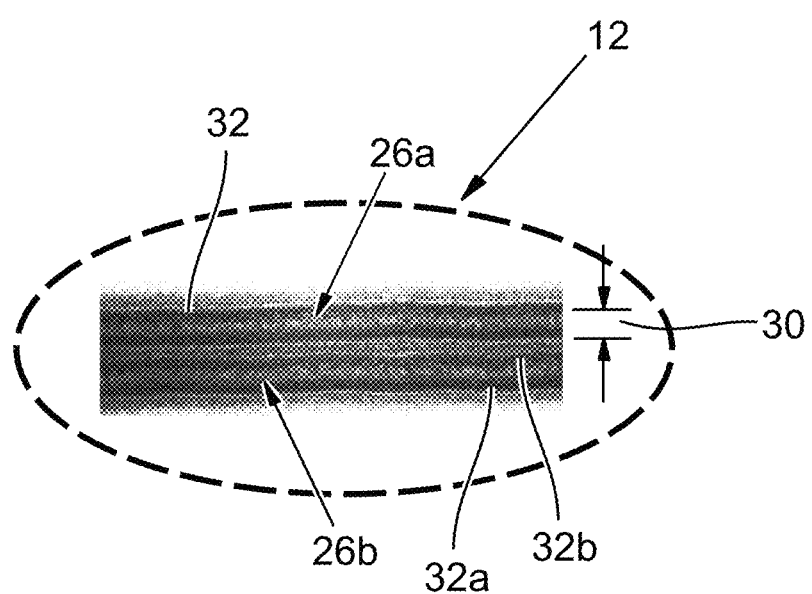
FIG. 2 is a photomicrograph showing two adjacent scribe lines created with a laser processing direction that was perpendicular to the gas flow direction.

FIG. 2 is a photomicrograph showing two adjacent scribe lines 26a and 26b on a portion of a workpiece 12. These scribe lines 26 exhibit deviation in kerf or scribe width 30 and deviation in roughness of edges 32a and 32b.

Figure 3A:
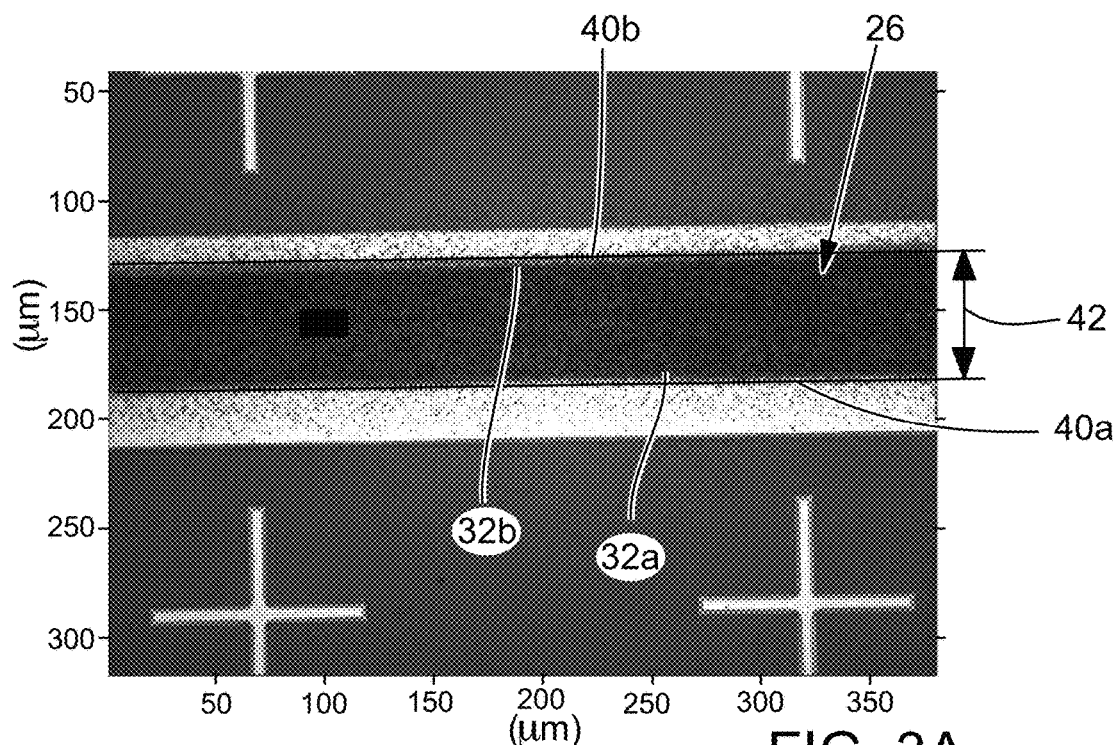
FIG. 3A is a photomicrograph showing superimposed curved fit lines that are superimposed curved lines tracing edge contours of the scribed edges of a scribe line to demonstrate a measurement standard for waviness.

FIG. 3A is a photomicrograph showing an exemplary scribe line 26 with superimposed curved fit lines 40a and 40b that are superimposed curved lines tracing edge contours of the scribed edges 32a and 32b of the scribe line 26 to demonstrate a measurement standard for waviness. In some standards, waviness can be measured across a single process field area (such as defined by a beam-positioning system or such as defined by feature boundaries on a workpiece 12) or across a whole workpiece 12, such as a wafer. In some standards, waviness can be defined as a standard deviation (in microns (μm)), across the designated scan field 14 or workpiece area, in a scribe width 42 as measured as a parallel distance between the two curved fit lines 40a and 40b that are fit to the scribed edges 32a and 32b of the scribe line 26.

Waviness or roughness can be characterized in a variety of different ways. For example, waviness or roughness can be characterized by one or more of the following characteristics: the maximum height of the roughness profile (the sum the largest height and valley deviation of a scribed edge 32 from the respective curved fit line 44), the maximum profile peak height of the roughness profile (the largest height deviation of a scribed edge 32 from the respective curved fit line 44), the maximum profile valley depth of the roughness profile (the largest valley deviation of a scribed edge 32 from the respective curved fit line 44), the mean height of the roughness profile elements, the total height of the roughness profile, the arithmetical mean deviation of the roughness profile, the root mean square deviation of the roughness profile, skewness of the roughness profile, the kurtosis of the roughness profile, the mean width of the roughness profile, and the root mean square slope of the roughness profile.

In some standards, waviness can be defined as a waviness scribe width span (μm) also as measured as a parallel distance between the two curved fit lines 40a and 40b that are fit to the scribed edges 32a and 32b of the scribe line 26. The waviness scribe width span can be defined as the maximum width minus the minimum width across the designated scan field 14 or workpiece area.

Figure 3B:
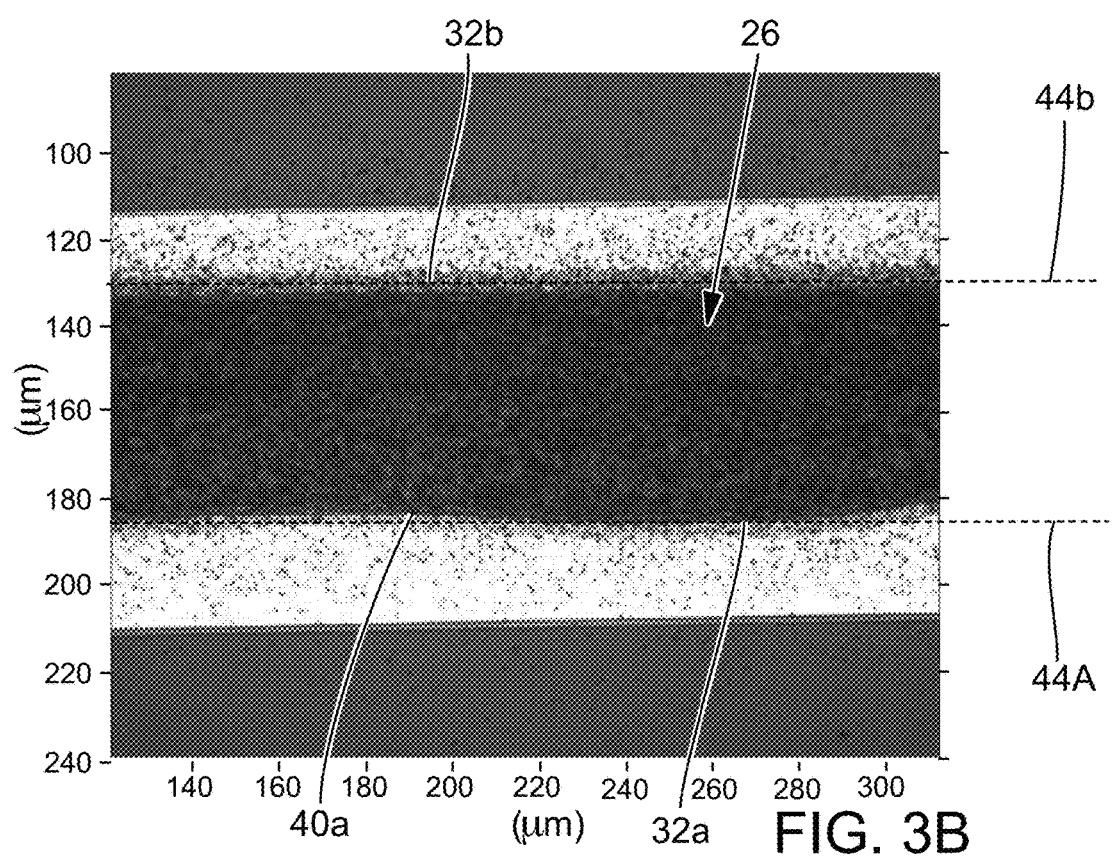
FIG. 3B is a photomicrograph showing superimposed mean (average) fit lines (straight lines extended by broken lines) that are fit to the scribed edges of an exemplary scribe line and also showing a superimposed curved line that traces an edge contour of one of the scribed edges to demonstrate a measurement standard for roughness.

FIG. 3B is a photomicrograph showing superimposed mean (average) fit lines (straight lines extended by broken lines) 44a and 44b that are fit to the scribed edges 32a and 32b of an exemplary scribe line 26 and also showing a superimposed curved line 40a that traces an edge contour of the scribed edge 32a to demonstrate a measurement standard for roughness. In some standards, roughness can be measured across single process field area or across a whole workpiece 12.

Figure 3C:
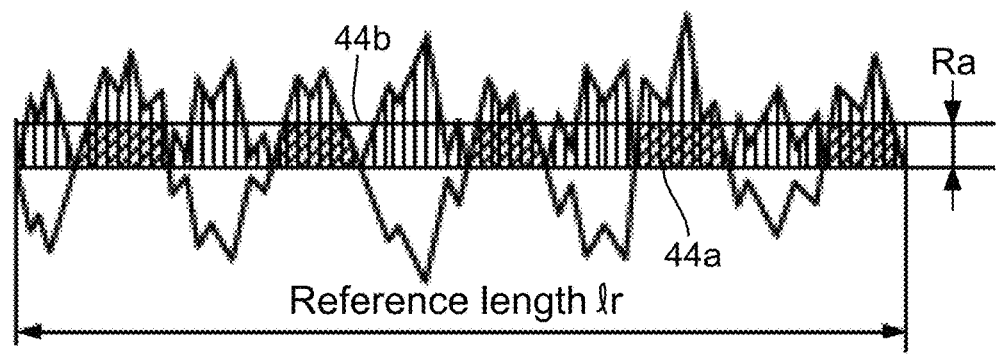
FIG. 3C provides shows a pictorial example and equation for determining the arithmetic mean for roughness.

In some standards, roughness can be measured as the absolute deviation amplitude of peaks and valleys of the scribed edges 32a and 32b from mean (average) straight fit lines 44a and 44b. For example, with reference to FIG. 3B, the absolute deviation amplitude of the peaks and valleys of the superimposed curved line 40a that traces an edge contour the scribed edge 32a can be take from the straight fit line 44a. The scribe roughness may be expressed as an arithmetic mean or a standard deviation in microns. FIG. 3C shows a more detailed example and equation for determining the arithmetic mean for roughness of the absolute value in a reference length. With reference to FIG. 3C, the exemplary equation is:

$$Za = \frac{1}{\ell r}\int_0^{\ell r} |Zn|dx,$$

where Za is the arithmetic mean roughness, where lr is the reference length, and where Zn is the deviation of the scribed edges 32a or 32b from the respective curved fit lines 44a and 44b at location n along the reference length lr.

Figure 4:
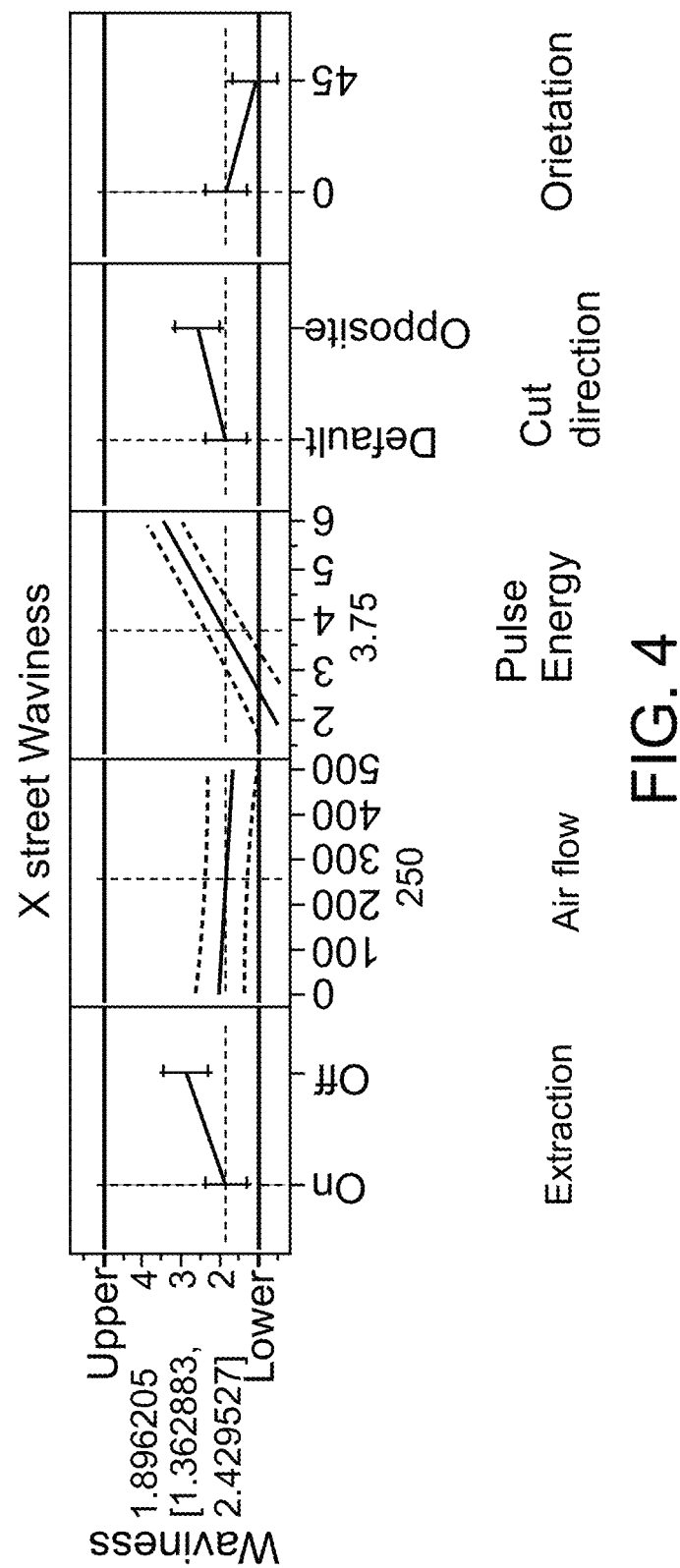
FIG. 4 is a chart showing results of experiments employed to determine degree of waviness of scribing with respect to several variables under other constant control conditions.

The applicant sought to understand the factors that drive the waviness and scribe roughness and performed a variety of experiments. FIG. 4 is a chart showing results of some experiments employed to determine degree of waviness of scribing with respect to several variables under other constant control conditions. With reference to FIG. 4, a green-wavelength laser producing pulses of femtosecond (fs) pulsewidth was used with a galvanometer-driven mirror 96 (FIG. 17) to test waviness of the scribe lines made under different variable conditions while other parameters were kept constant. These variables included: 1) the amount of vacuum pull in the exhaust capture direction 24; 2) the amount of gas flow in the gas flow in a gas flow direction 22; 3) the pulse energy delivered by the laser system; 4) the laser scanning direction with respect to the exhaust capture direction 24 and the gas flow direction 22, such as "default" which is scribing in a scan direction 20 against the wind in for Y-axis scribes and perpendicular to the wind for X-axis scribes, and such as "opposite" which is scribing in a scan direction 20 in the same direction of the wind for Y-axis scribes and perpendicular to the wind for X-axis scribes (the chart of FIG. 4 shows only the X-axis street waviness for these conditions); and the rotational orientation of the X-axis streets of the workpiece 12 with respect to the gas flow direction 22.

With reference again to FIG. 4, the dashed lines represent the intersection of the nominal conditions or settings versus the modeled result. In particular, the dashed vertical line represents the modeled condition or setting across the five variables in the depicted in the chart of FIG. 4; and, the dashed horizontal line represents the modeled waviness value for the given variables.

Without being held to any particular theory, the applicant speculated that debris and exhaust direction might have contributed to the waviness and roughness. Laser processing of semiconductor industry workpieces 12 is known to create an undesirable plume of debris of a variety of constituents in varying states of matter, such as gaseous or molten, depending on the materials of the workpieces 12 and the laser energy directed at the workpieces 12.

Much work has been attempted to prevent, or compensate for, laser-generated debris from being deposited onto the workpiece. See, for example, U.S. Pat. Nos. 5,925,024, 6,507,000, 6,586,707, 6,649,866, 6,710,294, 7,022,941, 7,038,164, 7,692,115, 7,947,919, 8,344,285, 8,383,984, and 8,809,732 and Chinese Pat. Pub. No. 103978308.

Figure 5:
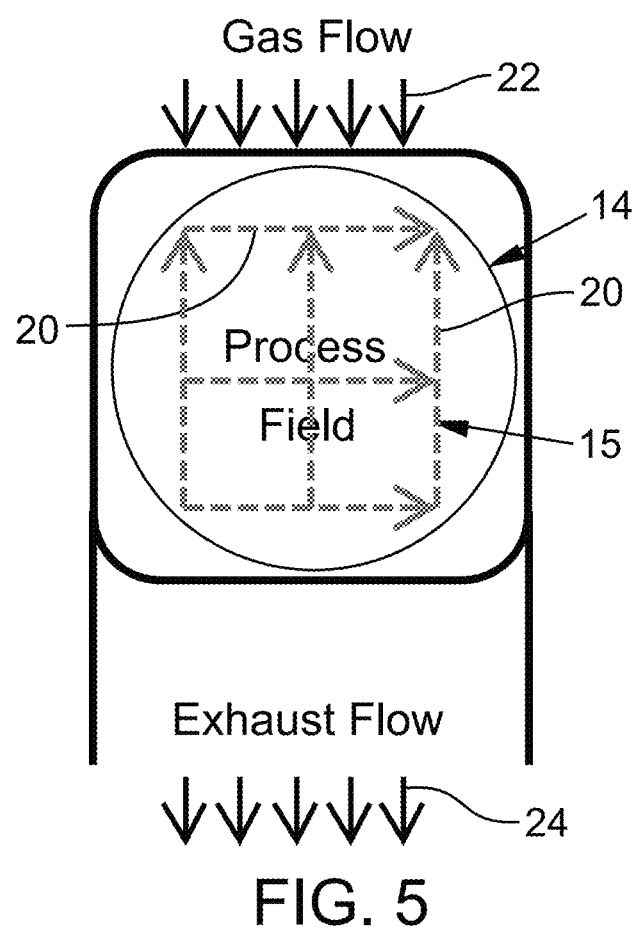
FIG. 5 is a diagram showing a default processing orientation with respect to gas flow direction.

FIG. 5 is a diagram showing a default processing orientation, wherein the workpiece 12 is aligned to the scan field 14 such that workpiece features, such as streets, or intended scribe lines 26 are aligned collinearly or perpendicularly to the gas flow direction 22 and the exhaust capture direction 24. Hence, the scan directions 20 are aligned collinearly or perpendicularly to the gas flow direction 22 and the exhaust capture direction 24, which may be parallel to the surface 88 (FIG. 17) of the workpiece 12. This gas flow direction component and exhaust capture direction component are typically horizontal components of the gas flow direction 22 and the exhaust capture direction 24. It will also be appreciated that gas flow direction 22 and the exhaust capture direction 24 could include direction components that are oriented toward or away from the surface 88 of the workpiece 12 (typically a vertical component of the gas flow direction 22).

The amount of vacuum pull in the exhaust capture direction 24 had a significant impact on waviness. Weaker vacuum pull resulted in greater waviness. Within the range tested, the amount of gas flow in the gas flow direction 22 had a negligible impact on waviness in the presence of vacuum pull. Only slight changes in waviness were noted at relatively low levels and at relatively high levels of gas flow in the gas flow direction 22. However, without the vacuum pull, the amount of gas flow has a significant impact on waviness.

Pulse energy also significantly impacted waviness at higher pulse energies, although waviness was not significant at lower pulse energies. Waviness generally increased as pulse energy increased. A sweet point for pulse energy was established for the control recipe at the highest pulse energy (3.75 micro Joules (uJ)) at which no significant waviness was observed. It is noted that this value would differ for a different recipe of laser parameters (and for different workpiece materials).

FIGS. 6A, 6B, and 6C are photomicrographs showing pairs of parallel scribe lines 26 created in a scribe direction 20c or 20d that is orthogonal to the gas flow direction 22 at different variable pulse energies. With reference to FIGS. 6A and 6B, the scribe lines 26 created at 1.5 uJ and 3 uJ exhibited no significant waviness. However, with reference to FIG. 6C, the scribe lines 26 created at 6 uJ clearly exhibit significant waviness.

Figure 7:
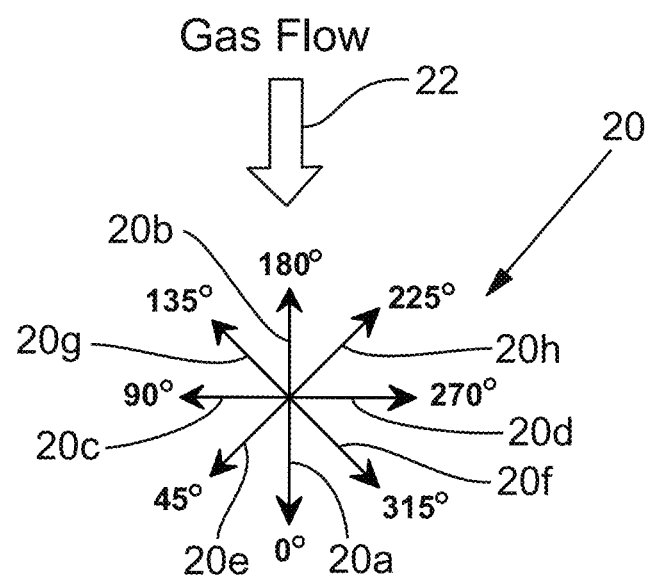
FIG. 7 is a diagram defining cutting direction with respect to gas flow direction.

FIG. 7 is an exemplary diagram defining scan direction 20 with respect to gas flow direction 22 that may be parallel to the surface 88 of the workpiece 12 (this gas flow direction component is typically a horizontal component of the gas flow direction 22), wherein: laser processing in a scan direction 20a with the gas flow direction 22 is represented by 0°; laser processing in a scan direction 20b against the gas flow direction 22 is represented by 180°; laser processing in processing directions 20c and 20d perpendicular to the gas flow direction 22 are represented by 90° and 270°, respectively; laser processing in processing directions 20e and 20f obliquely with the gas flow direction 22 are represented by 45° and 315°, respectively; and laser processing in processing directions 20g and 20h obliquely against the gas flow direction 22 are represented by 135° and 225°, respectively. It will be remembered that gas flow direction 22 could include gas flow direction components that are oriented toward or away from the surface 88 of the workpiece 12 (typically a vertical component of the gas flow direction 22).

With reference to FIGS. 4 and 7, the orientation of the scan direction 20 was varied with respect to the gas flow direction 22, such as from scan direction 20c at 90° to scan directions 20e and 20g at 45° and 135°, respectively, and such as from scan direction 20d at 270° to scan directions 20f and 20h at 315° and 225°, respectively. FIG. 4 shows that waviness decreased as the scan direction 20 changed from 0° to 45° with respect to the orthogonal scan directions 20c at 90° and 20d at 270°.

Other factors that impacted waviness included height of the gas input nozzle, with higher elevation being generally better (exhibited less waviness). Shape of the gas input nozzle also affects the scribe quality. In some of the experiments, one or more flat fan air knife-type gas input nozzles were employed. The waviness effect also appeared to worsen for high-overlap or low-scan velocity processes.

U.S. Pat. No. RE 43,400 discloses that scribe quality can vary with the polarization direction with respect to scan direction and teaches polarization directed can be correlated with scribe direction to improve scribe quality. U.S. Pat. No.

RE 43,400 is assigned to the assignee of the subject application and is incorporated herein by reference.

As previously noted, the laser machining industry has made efforts to manage plumes of debris caused be laser material interaction, such as laser ablation. The effects verified by the applicant are prevalent despite the use of a conventional gas flow system and a conventional vacuum exhaust pull system to manage debris. Without being tied to any particular theory, applicant suspects that localized adverse gas characteristics from debris, plume, or smoke generated by laser processing can create a post lens inadvertent beam diversion (e.g., refraction or reflection). The applicant further speculates, without being tied to any particular theory, that such post lens inadvertent beam diversion can result in accuracy and quality issues for the laser process. In particular, a scribe line 26 of a processing path that is perpendicular (90° or 270°) to the gas flow direction 22 may exhibit significant beam diversion, such as 1-10 µm inaccuracy, causing the appearance of waviness, roughness, wobble, and/or scalloping along the length of the scribe line 26.

FIG. 8 is a table showing least amount of wobble of scribes performed on a silicon workpiece 12 with respect to several variables under other constant control recipe conditions. The variables included pulse energy (µJ), direction relative to gas flow direction 22 (default—opposite or against the gas flow direction, opposite—with or in the gas flow direction), cut orientation (angular orientation of streets with respect to gas flow direction 22, wherein 0° in the table equals a scan direction 20a or 20b of 90° or 180° depending on relative air direction, and wherein 45° in the table equals a scan direction 20g or 20h of 135° (or 225°) or 45° or (315°) depending on relative air direction), air (20 or off), and exhaust (on or off). The wobble is expressed in a range of 1-5, with 1 indicating a low or insignificant amount of wobble (best) and 5 indicating a high amount of wobble (worst).

With continued reference to FIG. 8, the scribes with low pulse energy (1.5 µJ) all indicated low wobble regardless of gas flow direction 22 or street orientation. At a middle pulse energy (3 µJ), even scribing directly into the wind exhibited more wobble than did the low pulse energy pulses. A surprising discovery included good quality relatively low wobble scribes for the various recipes employing the oblique cut orientations (listed as 45° in the table) against the gas flow direction 22 (default) equating to the scan directions 20g and 20h, even at high pulse energy (6 µJ) and with the vacuum exhaust turned off. At the high pulse energy (6 µJ), all of the other recipe variations including scribing into the wind at the 0° cut orientation (180° scan direction 20b with respect to the gas flow direction 22) exhibited a more pronounced worse wobble effect than the recipe employing the oblique cut orientation (listed as 45° in the table) with the gas flow direction 22 (default) equating to the scan directions 20e and 20f, at high pulse energy (6 µJ) and with the vacuum exhaust turned on. The experimental results also provide a rough predictive table with regard to waviness, establishing how much waviness can be expected from a particular parameter recipe and providing a basis of whether the amount of waviness would be acceptable for a particular application.

FIGS. 9A and 9B are photomicrographs showing pairs of parallel scribe lines 26 formed at different pulse energies, 1.5 µJ and 6 µJ, with scribing in the scan directions 20g and 20h (obliquely into the wind) with respect to the gas flow direction 22. With reference to FIGS. 9A and 9B, the amount of waviness and roughness exhibited in the scribe lines 26 would be acceptable for all conventional laser-processing applications, even for the parameter recipe including the high-energy laser pulses. Moreover, the scribe lines 26 made in the orthogonal directions exhibit roughly the same waviness, which is quite different from orthogonal scribe lines 26 made directly opposite the gas flow direction 22 and perpendicularly to the gas flow direction 22.

Typically, conventional fixed beam-based and beam-axis scanning-based laser systems employ extraction or exhaust systems that provide a fixed gas flow direction 22 to collect processing debris. Due to the orthogonal streets on a semiconductor wafer, for example, one set of streets is conventionally processed with beam scan direction 20 that is opposite or against the gas flow direction 22, and the set of orthogonal streets is conventionally processed perpendicular to the gas flow direction 22. The experimental results disclosed herein shed light on why the waviness can differ dramatically for orthogonal scribe lines made by a conventional laser system.

It is noted that a conventional laser systems could be equipped with two sets of gas flow systems, each including pressurized in flow and vacuum out take, with their respective predominant flow directions oriented directly into the two orthogonal scribing directions over a stationary workpiece 12. Pneumatics values could be used to switch on and off the gas flow systems to process X and Y scribe lines 26 under the appropriate gas flow direction condition. This implementation would entail the added cost and complexity of including dual gas flow systems. The required pneumatic control changes would adversely affect scanning throughput and would limit flexibility in application of different laser parameter processing recipes.

Alternatively, a conventional laser system could be equipped with a single gas flow system, including pressurized in flow and vacuum out take, with the predominant flow direction oriented directly into one of the two orthogonal scribing directions over a workpiece 12. The workpiece 12 could then be rotated such that the Y streets are processed to completion against the wind before rotation and the X are processed against the wind after rotation. This implementation would entail the added cost and complexity of including a workpiece rotational system. The required rotational control changes would adversely affect scanning throughput and would limit flexibility in application of different laser parameter processing recipes.

FIG. 10A is a diagram showing one embodiment of an oblique processing orientation with respect to gas flow direction 22. This embodiment is one of numerous embodiments for the management of laser beam-steering mechanisms through systematic control of the relative direction laser beam scan directions versus a predominant gas flow direction 25 including the gas flow direction component parallel to the workpiece surface 88 and/or the exhaust vacuum outtake direction component parallel to the workpiece surface 88.

It will be appreciated that the predominant gas flow direction 25 can be a single direction of both the gas flow direction 22 and the exhaust capture direction 24. Alternatively, the predominant gas flow direction 25 can be an average direction of the gas flow direction 22 and the exhaust-capture direction 24. Moreover, in embodiments in which the gas flow direction 22 and the exhaust capture direction 24 are intentionally different, the average direction make also take into account differences in the amount of gas flow in the gas flow direction 22 and the exhaust capture direction 24 and/or differences in velocity of the gas flow direction 22 and the exhaust capture direction 24. Thus, the predominant gas flow direction 25 can be an average force direction of the gas flow. In many embodiments, a single direction of both the gas flow direction 22 and the exhaust capture direction 24 is preferred. However, in some embodiments, the deviation between the gas flow direction 22 and the exhaust capture direction 24 can be less than or equal to 20°. In some embodiments, the deviation between the gas flow direction 22 and the exhaust capture direction 24 can be less than or equal to 10°. In some embodiments, the deviation between the gas flow direction 22 and the exhaust capture direction 24 can be less than or equal to 5°.

In some embodiments, the X-and Y-axis streets of a wafer workpiece 12 are oriented at 135° and 225° respectively to the gas flow direction 22 and/or and the exhaust capture direction 24, so the relative motion of each laser scribe is against the gas flow direction 22 and/or the exhaust capture direction 24. Without being tied to any particular theory, the applicant speculates that by scanning the laser beam axis in a scan direction 20 that is against the gas flow direction 22, the relative velocity of the beam axis is increased with respect to localized adverse gas characteristics (such as from debris, plume, smoke, refractive index change, air pressure change, temperature change, or air turbulence) generated from the laser process, allowing the subsequent laser pulses to act un-influenced (e.g. not refracted or reflected) by the localized adverse gas characteristics. Such embodiments reduce the amount of such post-lens beam-steering effects and balance any actual post-lens beam steering effects between the scribe lines 26 of the two orthogonal axes. Either the features or intended features of the workpiece 12 can be orientated with respect to the gas flow direction 22 and/or the exhaust capture direction 24, or the gas flow direction 22 and/or the exhaust capture direction 24 can be orientated with respect to the features or intended features of the workpiece 12.

Figure 10B:
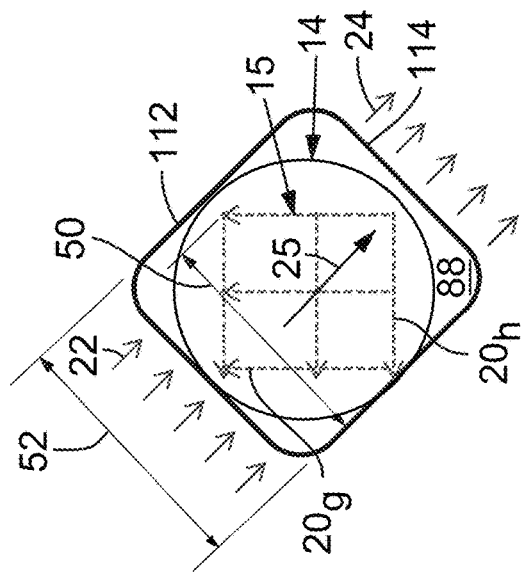
FIG. 10B is a diagram showing an alternative oblique processing orientation with respect to gas flow direction.

With reference to FIG. 10A, the workpiece 12 can be aligned in a conventional workpiece orientation to the scan field 14 (so that existing software and recipe parameters can be employed either with no modifications or with only optional modifications). However, the gas flow direction 22 and the exhaust capture direction 24 are obliquely oriented to the workpiece orientation in the scan field 14. In particular, with respect to FIG. 10A, the gas flow direction 22 and the exhaust capture direction 24 are oriented along the same diagonal axis of the scan field 14 such that the scan directions 20 shown in FIG. 10A are equivalent to the scan directions 20g and 20h of FIG. 7 with respect to the gas flow direction 22 and the exhaust capture direction 24. Moreover, FIG. 10A depicts only unidirectional process scanning in both orthogonal directions, i.e. each scribe line 26 is scanned obliquely against (obliquely opposite) the gas flow direction 22 (into the wind). Unidirectional scanning is described in greater detail with respect to FIG. 11. FIG. 10B is a diagram showing an alternative oblique processing orientation with respect to gas flow direction.

In some embodiments, the gas flow is introduced by an air nozzle or an air knife and/or the vacuum pull is established through an exhaust vent or exhaust foil that also collects the plume of debris generated by the process. This arrangement can push gas across the scan field 14 and/or pull gas across the scan field 14. In many embodiments, both the push and the pull are desired for establishing uniform gas flow across the scan field 14, which can be desirable for scribing quality and for minimizing waviness.

In some embodiments, the air nozzle or air knife can be adjustable with respect to elevation over the workpiece 12 and/or with respect to incline toward the workpiece 12. Similarly, the exhaust vent or exhaust foil can be adjustable with respect to elevation over the workpiece 12 and/or with respect to incline away from the workpiece 12. Additionally, the air nozzle, air knife, exhaust vent, or exhaust foil can be adjustable with respect to centering about the scan field and/or with respect to the wafer street axes, alignment marks, or other fiducials of the workpiece 12. Air introduction and collection nozzles are produced in variety of shapes, sizes, and configurations. For example, U.S. Pat. No. 9,259,802 discloses embodiments of gas nozzles. U.S. Pat. No. 9,259,802 is assigned to the assignee of the subject application and is incorporated herein by reference.

In some embodiments, gas flow through the air nozzle or air knife can be controlled by an adjustable rotometer or flow meter. In some embodiments, vacuum pull through the exhaust vent or exhaust foil can be controlled by a valve with feedback through a pressure sensor. Configurable ports to control direction and amount of a gas flow would typically be set before a processing run involving multiple workpieces 12; however, the direction and amount of gas flow can be adjusted if desired between orthogonal passes or at other times if desired. In some embodiments, the direction and amount of gas flow can be adjusted between each scan. Generally, however, equal scribe quality along the orthogonal streets is easiest to achieve if the gas flow direction and amount are consistent between the orthogonal scans.

With reference again to FIGS. 10A and 10B, in some embodiments, the scan field 14 has a major axis dimension 50 of a major axis that bisects the scan field 14, and the gas flow direction 22 and/or the exhaust capture direction 24 are generally perpendicular to the major axis that bisects the scan field 14. The gas flow may have a gas flow volume that travels along the gas flow direction 22, wherein the gas flow volume has a flow width dimension 52 that is perpendicular to gas flow direction 22, and wherein the flow width dimension 52 is greater than the major axis dimension 50. In addition to its application for controlling waviness, the vacuum exhaust capture system can help reduce debris that could be deposited on the workpiece and optics, thus increasing quality of the work products and increasing the life of the laser system, reducing mean time before failure and laser power transmission degradation.

In some embodiments, the scan direction 20 is at a 135°±22.5° angle with respect to a predominant or cumulative gas flow direction 25 of the gas flow direction 22 and the exhaust capture direction 24, wherein the gas flow direction 22 directed to the exhaust capture direction 24 has an orientation of about 0°. (In some embodiments, the predominant gas flow direction 25 may be the component of the predominant gas flow that is horizontally oriented or parallel to the workpiece 12.) In some embodiments, the scan direction 20 is at a 135°±11.25° angle with respect to a predominant or cumulative gas flow direction 25 of the gas flow direction 22 and the exhaust capture direction 24. In some embodiments, the scan direction 20 is at a 135°±5.125° angle with respect to a predominant or cumulative gas flow direction 25 of the gas flow direction 22 and the exhaust capture direction 24. In some embodiments, the scan direction 20 is at a 135°±2.563° angle with respect to a predominant or cumulative gas flow direction 25 of the gas flow direction 22 and the exhaust capture direction 24. In some embodiments, the scan direction 20 is at a 135°±1.281° angle with respect to a predominant or cumulative gas flow direction 25 of the gas flow direction 22 and the exhaust capture direction 24.

In some embodiments, the scan direction 20 is at a 225°±22.5° angle with respect to a predominant gas flow direction 25 (such as horizontally oriented or parallel to the workpiece) of the gas flow direction 22 and the exhaust capture direction 24, wherein the gas flow direction 22 directed to the exhaust capture direction 24 has an orientation of about 0°.

In some embodiments, the scan direction 20 is at a 225°±11.25° angle with respect to a predominant gas flow direction 25 of the gas flow direction 22 and the exhaust capture direction 24. In some embodiments, the scan direction 20 is at a 225°±5.125° angle with respect to a predominant gas flow direction 25 of the gas flow direction 22 and the exhaust capture direction 24. In some embodiments, the scan direction 20 is at a 225°±2.563° angle with respect to a predominant gas flow direction 25 of the gas flow direction 22 and the exhaust capture direction 24. In some embodiments, the scan direction 20 is at a 225°±1.281° angle with respect to a predominant gas flow direction 25 of the gas flow direction 22 and the exhaust capture direction 24.

Laser scanning at substantially +45° and −45° angles opposite to the gas flow direction 22 has the advantage of enhanced throughput because the process does not suffer a time penalty of having pneumatics values switch air flow direction or of having rotational mechanisms rotating the workpiece 12.

Scribe lines 26 made along the two orthogonal scan directions 20 oblique to and against the gas flow direction 22 exhibit similar waviness characteristics of good quality. The overall process quality is improved, facilitating straighter scribe edges, less edge waviness and less wobble, uniform or equal scribe quality of orthogonal scribe lines 26, steeper sidewalls or taper angle, more uniform kerf width (having lower standard deviation), improved position accuracy performance, and less noise and fewer outliers. The more uniform kerf width, improved position accuracy, and the less noise and fewer outliers permit more predictable smaller kerf width spans, which can allow for greater circuit density on the workpiece 12. The improved characteristics of the edges 32 tend to provide less opportunity for crack propagation in response to impacts. Conversely, rougher edges can provide projections that are more prone to impacts and crack propagation.

A secondary benefit of the orientation of the gas flow system is the collection of debris and particles to prevent optical degradation and contamination of other laser system components as well as protection of the workpiece 12 from redeposited materials Improved debris management reduces environmental contamination and facilitates increased lifetime of laser system optics, reduced cleaning frequency, and reduced cleaning time per cycle.

In some embodiments, scribe lines 26, made by orthogonal scan directions 20 under a gas flow direction 25 and having lengths of greater than or equal to 5 mm, exhibit a waviness standard deviation of less than 0.5 µm. In some embodiments, scribe lines 26, made by orthogonal scan directions 20 under a predominant gas flow direction 25 and having lengths of greater than or equal to 5 mm, exhibit a waviness standard deviation of less than 0.3 µm. In some embodiments, scribe lines 26, made by orthogonal scan directions 20 under a predominant gas flow direction 25 and having lengths of greater than or equal to 5 mm, exhibit a waviness standard deviation of less than 0.1 µm.

In some embodiments, scribe lines 26, made by orthogonal scan directions 20 under a gas flow direction 25 and having lengths of greater than or equal to 25 mm, exhibit a waviness standard deviation of less than 0.5 µm. In some embodiments, scribe lines 26, made by orthogonal scan directions 20 under a predominant gas flow direction 25 and having lengths of greater than or equal to 25 mm, exhibit a waviness standard deviation of less than 0.3 µm. In some embodiments, scribe lines 26, made by orthogonal scan directions 20 under a predominant gas flow direction 25 and having lengths of greater than or equal to 25 mm, exhibit a waviness standard deviation of less than 0.1 µm.

In some embodiments, scribe lines 26, made by orthogonal scan directions 20 under a predominant gas flow direction 25 and having lengths of greater than or equal to 5 mm, exhibit a difference in waviness standard deviation of less than 0.5 µm. In some embodiments, scribe lines 26, made by orthogonal scan directions 20 under a predominant gas flow direction 25 and having lengths of greater than or equal to 5 mm, exhibit a difference in waviness standard deviation of less than 0.3 µm. In some embodiments, scribe lines 26, made by orthogonal scan directions 20 under a predominant gas flow direction 25 and having lengths of greater than or equal to 5 mm, exhibit a difference in waviness standard deviation of less than 0.1 µm.

In some embodiments, scribe lines 26, made by orthogonal scan directions 20 under a predominant gas flow direction 25 and having lengths of greater than or equal to 25 mm, exhibit a difference in waviness standard deviation of less than 0.5 µm. In some embodiments, scribe lines 26, made by orthogonal scan directions 20 under a predominant gas flow direction 25 and having lengths of greater than or equal to 25 mm, exhibit a difference in waviness standard deviation of less than 0.3 µm. In some embodiments, scribe lines 26, made by orthogonal scan directions 20 under a predominant gas flow direction 25 and having lengths of greater than or equal to 25 mm, exhibit a difference in waviness standard deviation of less than 0.1 µm.

In some embodiments, scribe lines 26, made by orthogonal scan directions 20 under a predominant gas flow direction 25 and having lengths of greater than or equal to 5 mm, exhibit a waviness scribe width span of less than 0.5 µm. In some embodiments, scribe lines 26, made by orthogonal scan directions 20 under a predominant gas flow direction 25 and having lengths of greater than or equal to 5 mm, exhibit a waviness scribe width span of less than 0.3 µm. In some embodiments, scribe lines 26, made by orthogonal scan directions 20 under a predominant gas flow direction 25 and having lengths of greater than or equal to 5 mm, exhibit a waviness scribe width span of less than 0.1 µm.

In some embodiments, scribe lines 26, made by orthogonal scan directions 20 under a predominant gas flow direction 25 and having lengths of greater than or equal to 25 mm, exhibit a waviness scribe width span of less than 0.5 µm. In some embodiments, scribe lines 26, made by orthogonal scan directions 20 under a predominant gas flow direction 25 and having lengths of greater than or equal to 25 mm, exhibit a waviness scribe width span of less than 0.3 µm. In some embodiments, scribe lines 26, made by orthogonal scan directions 20 under a predominant gas flow direction 25 and having lengths of greater than or equal to 25 mm, exhibit a waviness scribe width span of less than 0.1 µm.

In some embodiments, scribe lines 26, made by orthogonal scan directions 20 under a predominant gas flow direction 25 and having lengths of greater than or equal to 5 mm, exhibit a difference in waviness scribe width span of less than 0.5 µm. In some embodiments, scribe lines 26, made by orthogonal scan directions 20 under a predominant gas flow direction 25 and having lengths of greater than or equal to 5 mm, exhibit a difference in waviness scribe width span of less than 0.3 µm. In some embodiments, scribe lines 26, made by orthogonal scan directions 20 under a predominant gas flow direction 25 and having lengths of greater than or equal to 5 mm, exhibit a difference in waviness scribe width span of less than 0.1 µm.

In some embodiments, scribe lines 26, made by orthogonal scan directions 20 under a predominant gas flow direction 25 and having lengths of greater than or equal to 25 mm, exhibit a difference in waviness scribe width span of less than 0.5 µm. In some embodiments, scribe lines 26, made by orthogonal scan directions 20 under a predominant gas flow direction 25 and having lengths of greater than or equal to 25 mm, exhibit a difference in waviness scribe width span of less than 0.3 µm. In some embodiments, scribe lines 26, made by orthogonal scan directions 20 under a predominant gas flow direction 25 and having lengths of greater than or equal to 25 mm, exhibit a difference in waviness scribe width span of less than 0.1 µm.

In some embodiments, edges of scribe lines 26, made by orthogonal scan directions 20 under a predominant gas flow direction 25 and having lengths of greater than or equal to 5 mm, exhibit a roughness standard deviation of less than 0.3 µm. In some embodiments, edges of scribe lines 26, made by orthogonal scan directions 20 under a predominant gas flow direction 25 and having lengths of greater than or equal to 5 mm, exhibit a roughness standard deviation of less than 0.1 µm. In some embodiments, edges of scribe lines 26, made by orthogonal scan directions 20 under a predominant gas flow direction 25 and having lengths of greater than or equal to 5 mm, exhibit a roughness standard deviation of less than 0.05 µm.

In some embodiments, edges of scribe lines 26, made by orthogonal scan directions 20 under a predominant gas flow direction 25 and having lengths of greater than or equal to 25 mm, exhibit a roughness standard deviation of less than 0.3 µm. In some embodiments, edges of scribe lines 26, made by orthogonal scan directions 20 under a predominant gas flow direction 25 and having lengths of greater than or equal to 25 mm, exhibit a roughness standard deviation of less than 0.1 µm. In some embodiments, edges of scribe lines 26, made by orthogonal scan directions 20 under a predominant gas flow direction 25 and having lengths of greater than or equal to 25 mm, exhibit a roughness standard deviation of less than 0.05 µm.

In some embodiments, edges of scribe lines 26, made by orthogonal scan directions 20 under a predominant gas flow direction 25 and having lengths of greater than or equal to 5 mm, exhibit a difference in roughness standard deviation of less than 0.3 µm. In some embodiments, edges of scribe lines 26, made by orthogonal scan directions 20 under a predominant gas flow direction 25 and having lengths of greater than or equal to 5 mm, exhibit a difference in roughness standard deviation of less than 0.1 µm. In some embodiments, edges of scribe lines 26, made by orthogonal scan directions 20 under a predominant gas flow direction 25 and having lengths of greater than or equal to 5 mm, exhibit a difference in roughness standard deviation of less than 0.05 µm.

In some embodiments, edges of scribe lines 26, made by orthogonal scan directions 20 under a predominant gas flow direction 25 and having lengths of greater than or equal to 25 mm, exhibit a difference in roughness standard deviation of less than 0.3 µm. In some embodiments, edges of scribe lines 26, made by orthogonal scan directions 20 under a predominant gas flow direction 25 and having lengths of greater than or equal to 25 mm, exhibit a difference in roughness standard deviation of less than 0.1 µm. In some embodiments, edges of scribe lines 26, made by orthogonal scan directions 20 under a predominant gas flow direction 25 and having lengths of greater than or equal to 25 mm, exhibit a difference in roughness standard deviation of less than 0.05 µm.

Figure 11A:
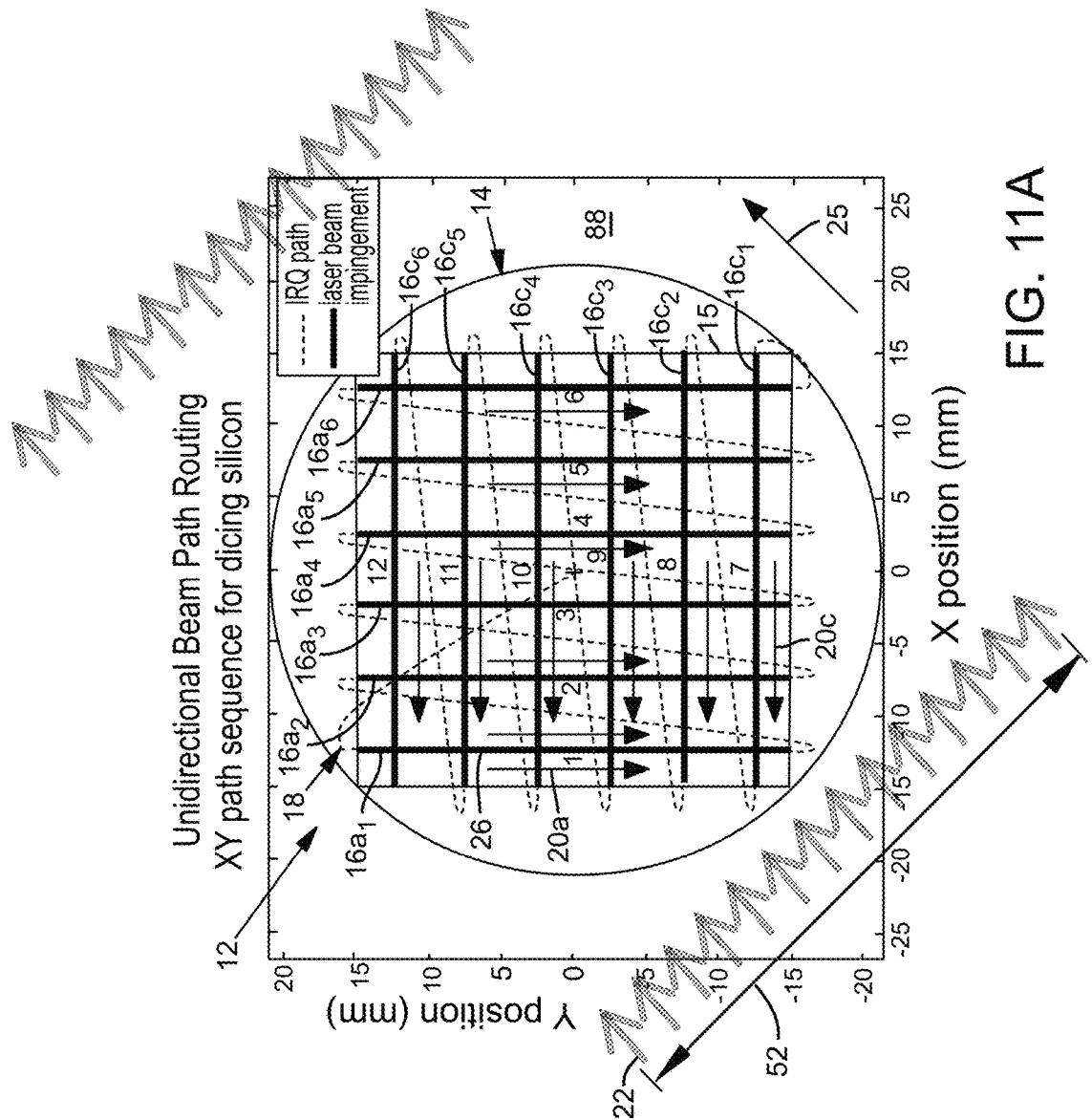
FIG. 11A is a diagram showing a simplified unidirectional scribing sequence over a workpiece.

FIG. 11A is a diagram showing a simplified unidirectional scribing sequence over a workpiece 12. FIGS. 11B, 11C, and 11D are graphs showing exemplary respective motion profiles of acceleration, velocity, and position versus time that correspond with the simplified unidirectional scribing sequence depicted in FIG. 11A.

With reference to FIGS. 11A-11D (collectively FIG. 11), the sequencing of laser scans can be controlled to minimize scan time for each workpiece 12 under a unidirectional scanning scheme. In some embodiments, the workpiece 12 can be positioned and aligned in a conventional manner to a scan field 14 or a workpiece support structure, such as a stage. In some embodiments, the laser beam axis is initially aligned (typically perpendicularly) with the center of a workpiece 12 or the center of the scan field 14. In FIG. 11A, the predominant gas flow direction 25 is diagonal (at a 45° angle) to the scan field 14, flowing from the lower left to the upper right. The intended scribe lines 26 are either parallel to or perpendicular to the perimeter of the scan field 14.

The gas flow direction 22 and the orientation of the intended scribe lines on the workpiece 12 promote certain sequences for scribing the streets of a workpiece that maximizes throughput for a unidirectional routing scheme. In some embodiments, a scribe line 26 is scanned from a first vertical staring point along a first orientation starting axis at a given process speed along a first vertical street axis, then the laser beam axis is rewound back to a neighboring second vertical starting point along the first orientation starting axis but in different cross-axis position that aligns with a second vertical street axis. In the embodiment portrayed in FIG. 11A, the heavy lines represent the scribe lines 26 along the scan paths 16, the light lines represent the rewind paths 17 (or IRQ paths 17) along which the laser beam axis travels while the laser is turned off or the laser pulses are blocked. In FIG. 11A, the laser scribing is initiated toward the upper left corner of the scan field 14, and the vertical streets are all scribed from up to down obliquely against the wind of the flow direction 22.

After the leftmost vertical street is scanned street, the beam axis travels along a transition path (while the laser is turned off or the laser pulses are blocked) to a horizontal first starting point. A scribe line 26 is then scanned from the first horizontal staring point along a second orientation starting axis at a given process speed along a first horizontal street axis, then the laser beam axis is rewound back to a neighboring second horizontal starting point along the second orientation starting axis but in different cross-axis position that aligns with a second horizontal street axis. The horizontal streets are all scribed from up to down obliquely against the wind of the flow direction 22. It will be appreciated that vertical and horizontal are used herein for convenience as relative terms and that the workpiece 12 is most commonly supported in an orientation so that the streets are parallel to the floor.

The X-axis and Y axis streets in the entire large scan field 14 (such as 30 mm×30 mm) can be processed in one continuous operation, wherein the laser beam pulses are blocked while the laser beam axis is directed through the rewind and transition paths.

It is noted that many types of beam-positioning systems that employ a mobile beam axis can accelerate and move the beam axis extremely fast. For example, a typical maximum velocity for galvanometer-based system is about 4-5 meters per second (m/s), so the beam axis can traverse a 20 millimeters (mm) scan field 14 in about 4-5 milliseconds (ms) if desired. Accordingly, the added time penalty for unidirectional routing is small, and such penalty is negligible compared to the time required to make pneumatic changes to the gas flow direction 22 or the time required to change the orientation of the workpiece 12.

In many embodiments, the laser beam axis will directed over the scan path for several passes until the laser processing operation is completed. These repeated scan passes can be aligned to completely overlap a previous scan pass, partly overlap a previous scan pass, or be displaced from and be non-overlapping of a previous scan pass such that the scribe lines 26 respectively completely overlap a previous scribe line 26, partly overlap a previous scribe line 26, or be displaced from and be non-overlapping of a previous scribe line 26.

Additionally, the laser parameter recipes for each scan pass may be independently selected, such that any two scan passes may utilized one or more different values for one or more different laser parameters. Moreover, the laser parameter recipes can be varied within a scan pass, can be varied between the different orthogonal scan pass segments, or can be varied with an individual scan pass segment. For example, a first set of parallel streets may be processed with a first laser parameter recipe, and then a second set of parallel streets (which are orthogonal to those of the first set) may be processed with a laser parameter recipe that blocks or modifies the pulses of the laser beam whenever the scan of laser beam axis crosses the scribe lines 26 made along the first set of parallel streets (so that the intersections of the two sets of streets are not doubly-processed).

Figure 11E:
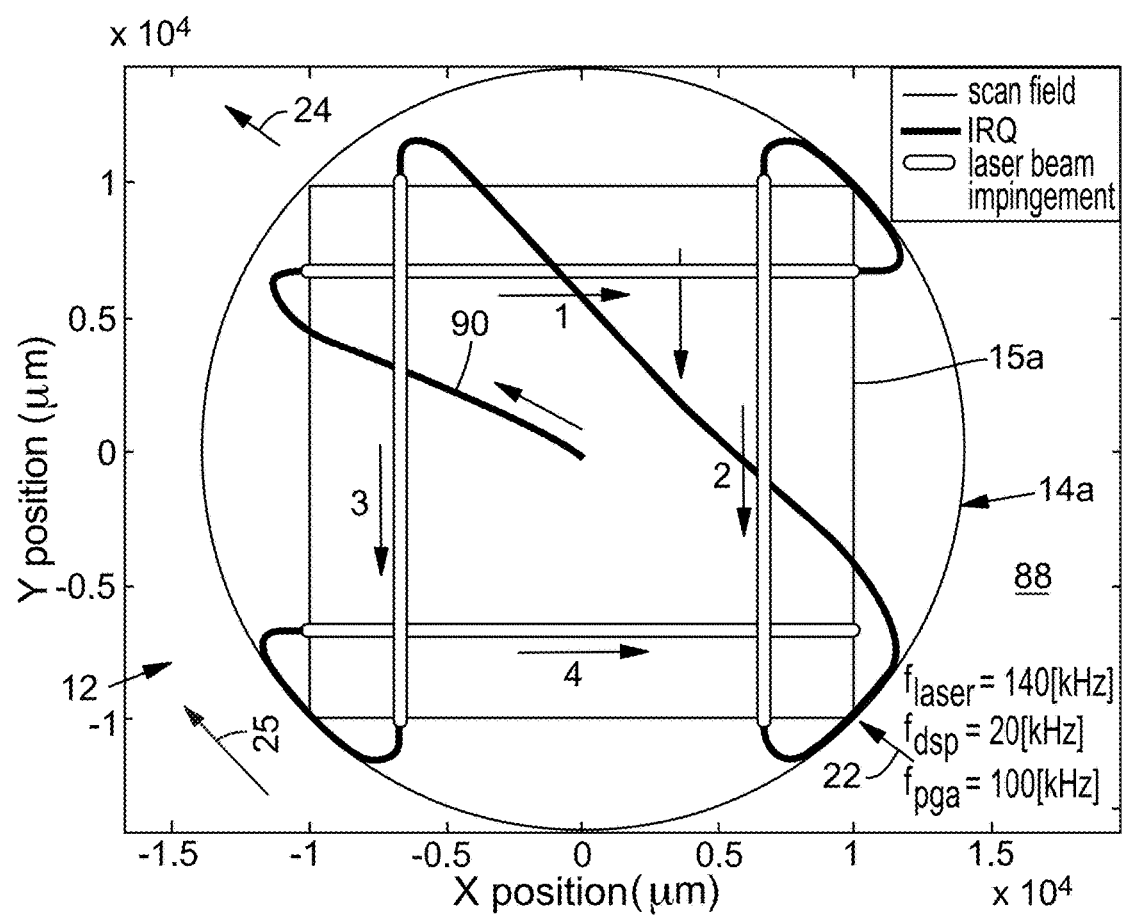
FIG. 11E is a diagram showing a simplified alternative unidirectional scribing sequence over a workpiece.

FIG. 11E is a diagram showing a simplified alternative unidirectional scribing sequence over a workpiece 12. With reference to FIG. 11E, the movement pattern 18 can be adapted to a smaller area, such as a smaller scan field 14a . Smaller movement patterns 18 or scan fields 14a may be sized to: separate individual features or devices from the workpiece 12; accommodate field of view or bandwidth limitations of a beam steering component (such as an AOM); maximize throughput; accommodate or take advantage of laser parameter recipes; or accommodate or take advantage of transient laser-material interactions. The scan field 14a in FIG. 11E is sized to separate an individual circuit positioned between two pairs of orthogonal streets.

The scan path is continuous over the component scan field 14a. All scribing scans are obliquely oriented against the gas flow direction 22. The beam pulses are blocked while the laser beam axis moves along the rewind and transition paths represented by the dark lines, and the beam pulses are unblocked while the laser beam axis scans the street sub segments of the workpiece 12.

The component scan fields 14a can be processed in a sequence such that all the first pulses of each scribe scan within a component scan field 14a are positioned to start on a previously scribed area (end of an abutting scribe segment from adjacent previously scribed component scan field 14a). U.S. Pat. Pub. No. 2014/0312013 discloses in greater detail laser processing techniques, including beam axis movement, command controls, and laser parameter recipes that address processing adjacent overlapping scan fields 14. U.S. Pat. Pub. No. 2014/0312013 is assigned to the assignee of the subject application and is incorporated herein by reference. It is noted that the scan 14, itself, may be one of many adjacent scan fields 14 on a much larger workpiece 12 and may include multiple component scan fields 14a. In some embodiments, the scan field 14 may represent the area addressed by a pair of galvanometer-driven mirrors 96. In some embodiments, the scan field 14a may represent the area addressed by a high-speed steering device, such as AOM or pair of AOMs.

Figure 12:
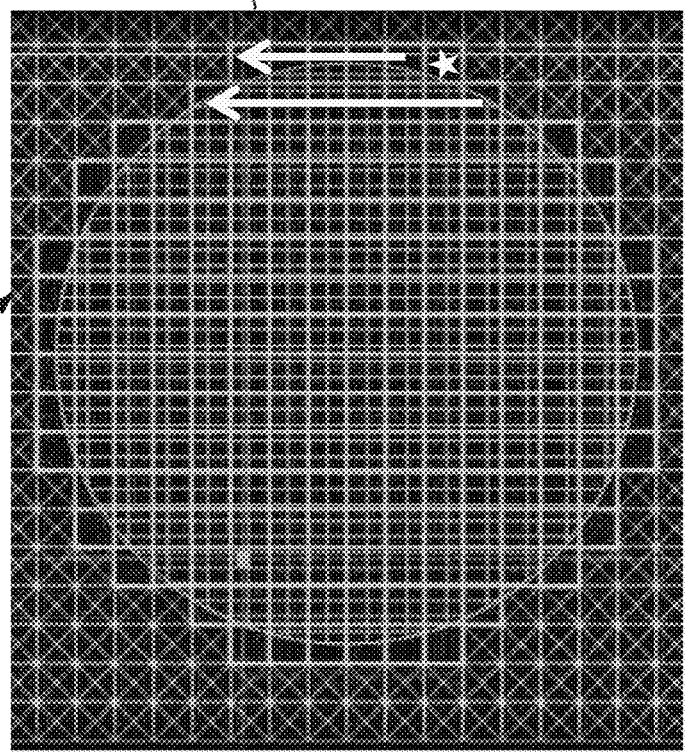
FIG. 12 is a diagram showing an embodiment of scan field sequencing that coordinates with the gas flow direction and processing orientation shown in FIG. 10B.

FIG. 12 is a diagram showing an embodiment of scan-field sequencing that coordinates with the gas flow direction and processing orientation shown in FIG. 10B. The scan-field sequencing scheme depicted in FIG. 12 is somewhat similar to the scan-field sequencing scheme described in connection with FIG. 11A. However, the scan-field sequencing scheme depicted in FIG. 12 starts at the bottom right of the workpiece 12, scribes the vertical streets bottom to top, and scribes the horizontal streets right to left to orient the scan directions obliquely against the gas flow direction 22. It is noted that the streets of workpiece 12 have a conventional orientation with respect to the support stage and beam-positioning system and that the gas flow direction is 22 set up to be oblique to the traditional X and Y axis scanning profile. The advantage of this approach is that it conserves existing software with respect to beam axis positioning and movement along streets of the workpiece.

Figure 13A:
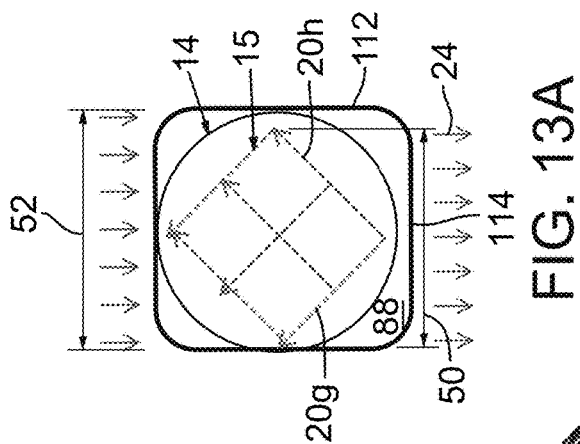
FIG. 13A is a diagram showing a proposed processing orientation with respect to gas flow direction.
Figure 13B:
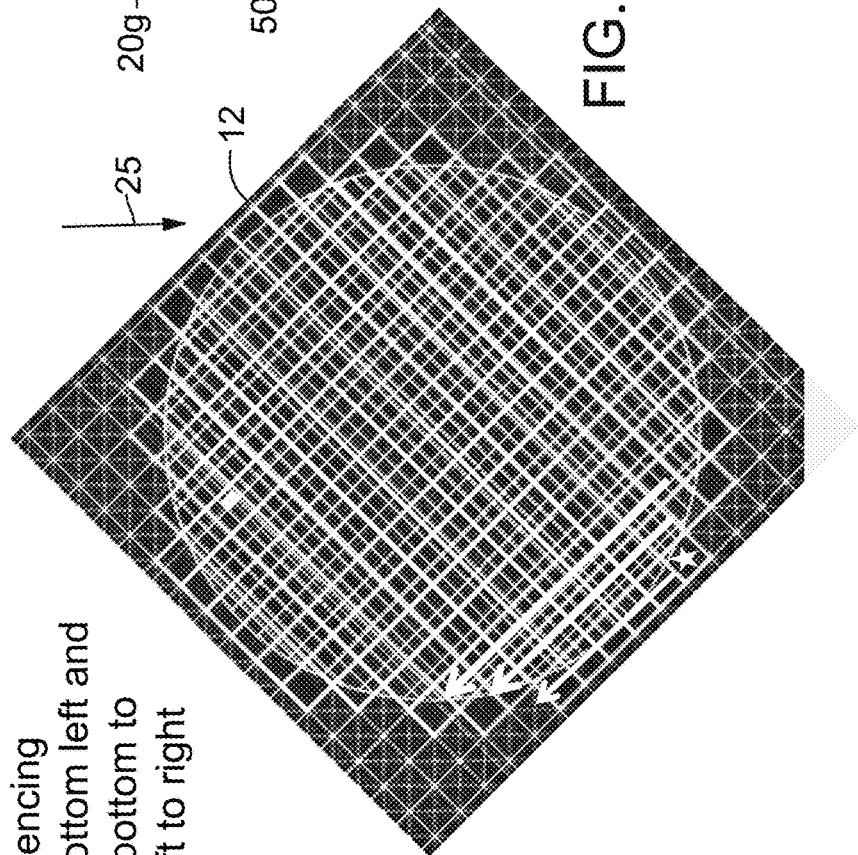
FIG. 13B is a diagram showing a proposed field sequencing approach to coordinate with the proposed processing orientation and gas flow direction shown in FIG. 13A.

FIG. 13A is a diagram showing an alternative embodiment of an oblique processing orientation with respect to gas flow direction 22. FIG. 13B is a diagram showing an alternative embodiment of scan-field sequencing that to coordinates with the proposed processing orientation and gas flow direction shown in FIG. 13A. With reference to FIGS. 13A and 13B, the conventional gas flow system is conserved with a standard gas flow direction 22, but the workpiece 12 is mounted with its streets at a 45° angle to the standard orientation with respect to the support stage and beam-positioning system and conventional beam-positioning software instructions.

The scan-field sequencing scheme depicted in FIG. 13B is somewhat similar to the scan-field sequencing scheme described in connection with FIGS. 11A and 12. However, the scan-field sequencing scheme depicted in FIG. 13B starts at the bottom left of the workpiece 12, scribes the obliquely leftward streets bottom to top, and scribes the obliquely rightward streets bottom to top to orient the scan directions obliquely against the gas flow direction 22.

Figure 14:
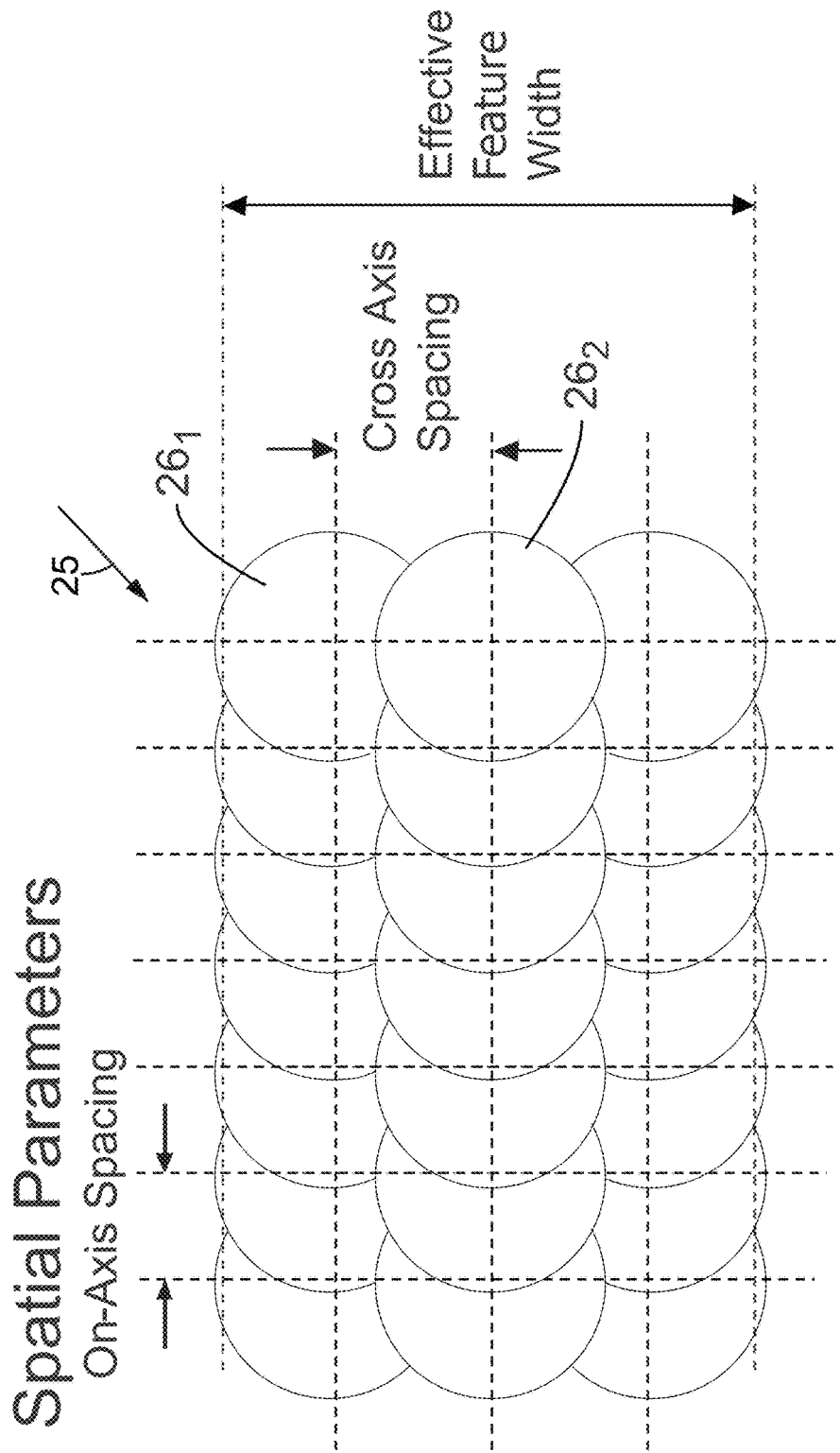
FIG. 14 is a diagram showing an application of multiple overlapping scribe lines to form a feature such as kerf on a workpiece.

FIG. 14 is a diagram showing an application of multiple overlapping scribe lines 26 ($26_1$, $26_2$, $26_3$), including the overlapping laser spots in each scribe line, to form a feature such as kerf on a workpiece 12. With respect to FIG. 14, a workpiece feature, such as kerf or mark, to be machined may have a width that is wider than the width of a scribe line 26 that is formed by a single scan pass of the laser beam axis. The cross-axis spacing 56 of the centers of adjacent scribe lines 26 may be a function of the desired kerf width, spot size, and desired overlap between spatially adjacent scribe lines 26. These parameters can directly influence the number of passes employed to process a street or create the workpiece feature. The on-axis spacing of laser spots may be driven by desired on-axis spot overlap, laser-beam spot size, and bite size. These parameters can directly influence the velocity of the beam axis with respect to the workpiece 12. Some of these topics are described in U.S. Pat. No. 6,586,707 and U.S. Pat. No. RE 43,400, which are assigned to assignee of the subject application, and which are incorporated herein by reference.

Figure 15:
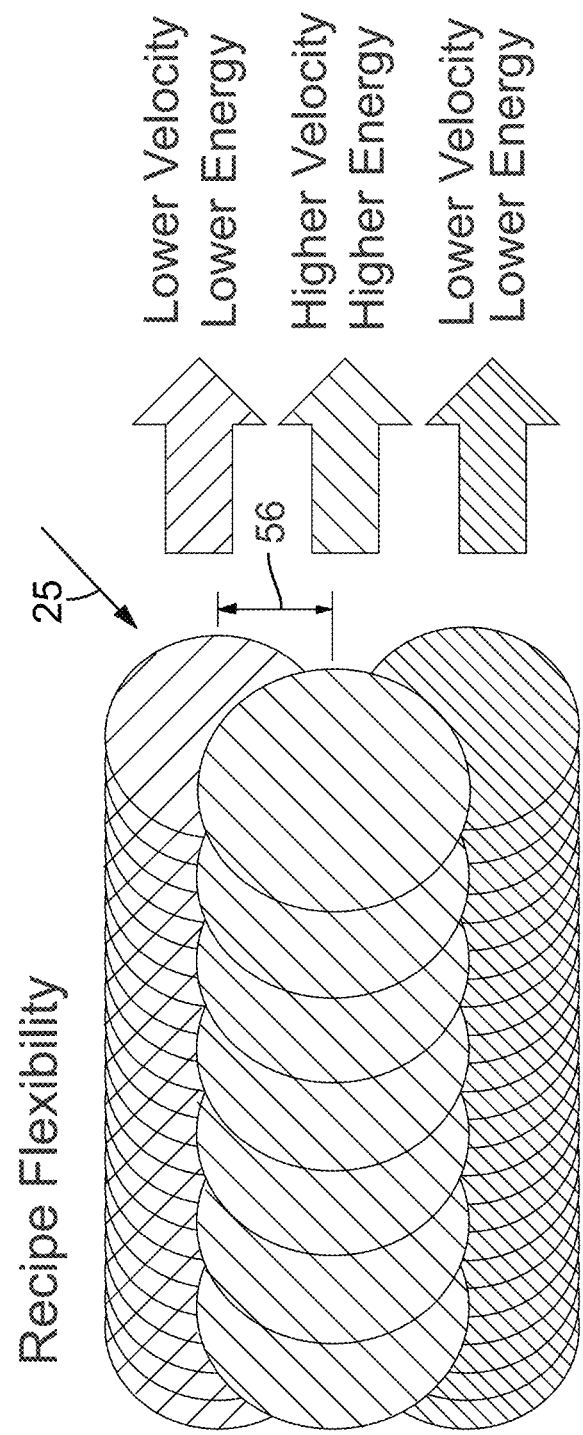
FIG. 15 is a diagram showing exemplary application of different parameter recipes for overlapping scribe lines used to form a feature.

FIG. 15 is a diagram showing exemplary application of different parameter recipes for overlapping scribe lines 26 used to form a feature. The laser parameter recipe can be controlled on a per scan pass basis to minimize the laser material interaction that drives the inadvertent post-lens beam steering and waviness, i.e. the recipe for each of the overlapping scribe lines 26 can be created by an individualized recipe (or they can share recipes). For example, the scribe lines 26 in the center of the kerf can be formed with a higher dose or energy than the scribe lines 26 at the edge of the kerfs, thus producing less edge waviness of the kerf and improved process quality. As noted earlier, partial segments of the each scan pass of a street may also employ different recipe components. Similarly, X and Y streets may share laser parameter recipes or may have different recipes. Moreover, the intersections of the X and Y scribe lines 26 may be processed with different parameters than the non-intersecting portions of the X and Y scribe lines 26. Also, the order in which the passes are executed can be part of the recipe. In particular, the scribe line $26_2$ in the center of the kerf can be processed before either of the scribe lines $26_1$ and $26_3$, after both of $26_1$ and $26_3$, or between $26_1$ and $26_3$. It is noted that repetition and pass are sometimes used synonymously; however, repetition implies performing the exact same recipe step, two or more times. Repetition of that same recipe is often employed in dicing applications.

Figure 16A:
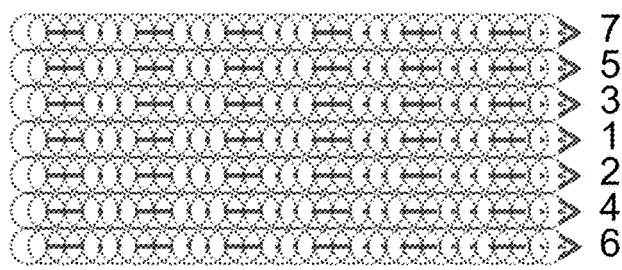
FIGS. 16A and 16B are diagrams showing alternative scan sequences for multiple overlapping scribe lines to form a feature.
Figure 16B:

FIGS. 16A and 16B are diagrams showing alternative scan pass sequences for multiple overlapping scribe lines 26 to form a feature. In particular, the order in which overlapping scribe lines 26 are scanned within a street segment can be controlled. The waviness effect correlates to the pulse energy used and the material volume removed, by altering the order and/or relative position of the overlapping scribe lines 26, waviness can be effectively hidden inside the kerf by using an "in to out" scribe order, wherein the first scribe line 26 is about the center of the street, and subsequent scribes lines are positioned further from the street center until the desired kerf width is achieved.

With reference to FIG. 16B, an "out to in" scribe order can be implemented for some embodiments. In particular, the first and second scans of the depicted embodiment may be delivered with less pulse energy that the scans that are performed more to the midline of the kerf.

It will also be appreciated that numerous other scribe orders are possible. For example, a sequentially adjacent scribe order could be employed, especially if the scribe lines 26 at the edges of the kerf are delivered with lower pulse energy. Similarly, a random order can be employed.

A recipe process step may involve a single scribe line 26. Typically multiple recipe process steps that can differ in energy, velocity, bite size and cross-axis position can be employed to create a kerf of a desired width. Default sequence recipe processing is "breadth first," where each recipe process step is distributed across the X and Y street segments before progressing to a second recipe step. This breadth first recipe processing sequence would also typically include all repetitions of passes using the same recipe before progressing to the second recipe step. However, for some embodiments, a "depth first" type of recipe can be employed, wherein all recipe steps are delivered to a single street segment before moving to the next street segment.

Typical recipe parameters include: pulse energy levels from 0.1-20 µJ; pulse repetition rates of 100 KHz-100 MHz; pulsewidths of 0.1 ps to 500 ns, a more particularly of 0.1 ps to 1 µs; wavelengths from 208 nm to 1700 nm (preferably UV, green or IR); spot sizes (major axis, diameter, or spot waist) from 10-50 µm; bite sizes of 0.1-20 µm; scan velocities up to about 4-5 m/s; temporal pulse shape comprising one of Gaussian, shaped, "top hat," or "chair shape;" spatial pulse shape comprising one of round, circular, square, elliptical, rectangular, bezel, or donut; laser mode comprising one of continuous, pulsed, or burst.

Scanning in a direction that is obliquely opposite to the predominant gas flow direction 25 permits use of greater pule energy or fluence than could be used for scanning in a direction perpendicular to wind, which would exhibit relatively worse waviness characteristics at the higher pulse energies and fluences. In some embodiments, the pulse energy is greater than or equal to 2 µJ. In some embodiments, the pulse energy is greater than or equal to 6 µJ. In some embodiments, the bite size is less than or equal to 5 µm. In some embodiments, the spot overlap is greater than or equal to 50%. In some embodiments, the transverse scan time limit is less than or equal to 0.5 s. In some embodiments, the repetition rate is greater than or equal to 1 MHz.

FIG. 17 is a schematic diagram of a simplified laser micromachining system 60 employing a gas flow assembly 62 capable of implementing the cooperative gas flow and scanning techniques described herein. With reference again to FIG. 17, the laser 64 of the exemplary laser micromachining system 60 emits a beam of laser pulses along an optical path 66 that propagates through a variety of optical components 68, a pulse-picking device 74, one or more fold minors 78 to a fast-positioner 80 of a beam-positioning system 82 which ultimately directs a beam axis 84 of the optical path 66 through a scan lens 85 onto a spot position 86 on a surface 88 of the workpiece 12. In some embodiments, the fast positioner 80 and the scan lens may be configured to form a laser scanning head that is movable as unit, such as along rails of a gantry system. The optical components 68 may include a variety of well-known optics such as beam expander lens components, optional attenuators such as acousto-optic or electro-optic devices, and/or feedback sensors such as for energy, timing, or position, that are positioned at various positions along the optical path 66.

The pulse-picking device 74 acts as a high-speed shutter that blocks or permits laser pulses from propagating further along the optical path 66 and determines which laser pulses are permitted to impinge on the workpiece 12. The pulse-picking device 74 may include an electro-optic device or an acousto-optic modulator (AOM) 90. The AOM 90 is responsive to AOM command signals that are delivered along an AOM signal path 92 from a controller 94. The AOM command signals cause a transducer on the AOM 90 to initiate sound waves in the AOM that cause a beam propagating through the AOM 90 be diverted along predetermined exit angles that either align or don't align with the optical path 66 to the fast positioner 80. Alternatively, an intra-cavity Q-switch 106 can be employed to prevent the laser 64 from generating a beam during non-impingement portions 17 of the movement pattern 18.

The fast positioner 80 may include any beam-positioning device capable of quickly changing the direction of the beam axis 84 over a relatively large scan field 14. In some embodiments, the fast positioner 80 may include a pair of galvanometer-driven X-axis and Y-axis mirrors 96 the workpiece 12. In some embodiments, the scan field 14 has a diameter (or major axis) of 10 mm to 100 mm. In some embodiments, the scan field 14 has a diameter that is greater than 15 mm. In some embodiments, the scan field 14 has a diameter of 25 mm to 50 mm. In some embodiments, the scan field 14 has a diameter that is smaller than 75 mm. In some embodiments, the scan field 14 may include galvanometer movement areas not usable for laser processing due to edge effects of the scanning lens, so the utilizable processing field 15 (FIGS. 1, 5, 10A, 11A, and 11E, for example) may be smaller than the scan field 14.

Depending on the size of the desirable scan field 14, the fast positioner 80 may alternatively employ a high-speed positioner, such as an acousto-optic device or a deformable mirror (or other fast steering mirror), even though these devices tend to have smaller beam deflection ranges than galvanometer mirrors 96. Alternatively, a high-speed positioner may be employed in addition to the galvanometer mirrors 96 and can be integrated with the control and movement of the beam axis 84 provided by the galvanometer mirrors 96 or can be superimposed on the movement of the beam axis 84 provided by the galvanometer mirrors 96, such as for error correction. In some embodiments, the fast positioner 80 is supported in a fixed position. In other embodiments, the fast positioner 80 is supported by a stage that is moveable with respect to the workpiece 12, such as in a split-axis system. An exemplary fast positioner 80 has a bandwidth of hundreds of kilohertz and is capable of a linear velocity from about 2 or 3 m/s to about 10 m/s and an acceleration of about 1000 to 2000 G. Naturally, the linear velocity can operate below these ranges as well.

In some embodiments, the beam-positioning system 82 employs a workpiece-positioning stage 100 that preferably controls at least two platforms, such as an upper stage 102, which may support a chuck 98 that supports the workpiece 12, and a lower stage 104, which supports the upper stage 82. The chuck or the workpiece 12 is typically placed or oriented in a processing station that may be defined by the area of operational capability of the beam-positioning system 82 and that may optionally include the ranges of movement of the stages. In some embodiments, the workpiece 12 or the chuck 98 may be oriented to with respect to the processing station or with respect to the scan field 14 or the processing field 15. In some embodiments, one or more features may be used for orientation. In some embodiments, these features may be fiducials, streets, or specific alignment marks, or the like. Other alignment orientation techniques could be employed. It is noted that the workpiece can be aligned to a specific scan field 14 or processing field 15 orientation (such as predetermined by software or processing recipes), or the scan field 14 or processing field 15 can be aligned to the features on the workpiece 12.

These upper and lower stages 102 and 104 are typically moved by linear motors and are commonly referred to as X-Y stages, with the upper stage 102 moveable in one axis and the lower stage 104 moveable in the other axis. A typical workpiece-positioning stage 100 has a bandwidth of tens of kilohertz and is capable of a velocity of 2 or 3 msec and an acceleration of 1.5 G or greater. Current cost-effective translation stages perform in a range of about 400 mm/s to about 1 m/s. Naturally, they can move much more slowly as well. The working envelope of the workpiece-positioning stage 100 is typically much larger than the scan field 14 of the galvanometer mirrors 96.

In some embodiments, the laser micromachining system 60 performs laser dicing in a step and repeat manner, wherein the workpiece-positioning stage 100 moves the workpiece 12 to a position with respect to the fast positioner 80 and the beam axis 84 such that the workpiece position is maintained during the dicing operation which is conducted by the fast positioner 80. In particular, the workpiece-positioning stage 100 may position specific areas of the workpiece 12 within the scan field 14 of the galvanometer mirrors 96. The galvanometer mirrors 96 may direct the beam axis 84 to perform one or more recipes or movement patterns 18 that include one or more cutting scan paths 16 within the scan field 14 over the workpiece 12 while the workpiece-positioning stage 100 may be completely stopped over the scan field 14. In some embodiments, for desirable throughput, the beam axis 84 does not come to rest until all of the passes of the movement patterns 18 over a given scan field 14 are completed.

After one or more passes of the beam axis 84 in the movement patterns 18, the workpiece-positioning stage 100 may move to position the scan field 14 of the galvanometer minors 96 over a different area of the workpiece 12, such as a neighboring area or scan field 14. For some embodiments, no laser processing occurs while the beam axis 84 is accelerating. The advantages of using a beam axis with constant velocity movement and constant repetition rate pulses include stable and predictable laser pulse characteristics.

The techniques disclosed herein can be implemented on the ESI model 9900 and 9970 machines, which employ galvanometer-based beam-positioning systems, such as sold by Electro Scientific industries Inc. (ESI) of Portland, Oreg. Additionally, the techniques disclosed herein can be implemented on any ESI galvanometer-based scribing, dicing, or marking laser system. The techniques disclosed herein can also be implemented on any ESI laser system employing a mobile beam-steering axis.

Any of the laser systems and laser processing techniques, including beam axis movement, command controls, and laser parameter recipes, disclosed in U.S. Pat. Nos. 6,586,707, 6,841,482, 7,947,575, U.S. Pat. Pub. No. 2011/0029124, and U.S. Pat. Pub. No. 2014/0312013 that are not mutually exclusive to unidirectional laser scanning can be implemented so that the laser scanning direction is obliquely oriented against the predominant gas flow direction 25 as disclosed herein. U.S. Pat. Nos. 6,586,707, 6,841,482, 7,947,575, U.S. Pat. Pub. No. 2011/0029124, and U.S. Pat. Pub. No. 2014/0312013 are assigned to the assignee of the subject application and are incorporated herein by reference.

In addition, any of the laser systems and laser processing techniques, including beam axis movement, command controls, and laser parameter recipes, disclosed in U.S. Pat. No. RE 43,400 that are not mutually exclusive to unidirectional laser scanning can be implemented so that the laser scanning direction is obliquely oriented against the predominant gas flow direction 25 as disclosed herein. U.S. Pat. No. RE 43,400 is assigned to the assignee of the subject application and is incorporated herein by reference.

The scan direction to gas flow direction techniques can also be implemented on laser systems employing multiple beams to perform the laser scans simultaneously or sequentially. In some embodiments, the two beams may be employed to provide the scans in the orthogonal directions.

Figure 18A:
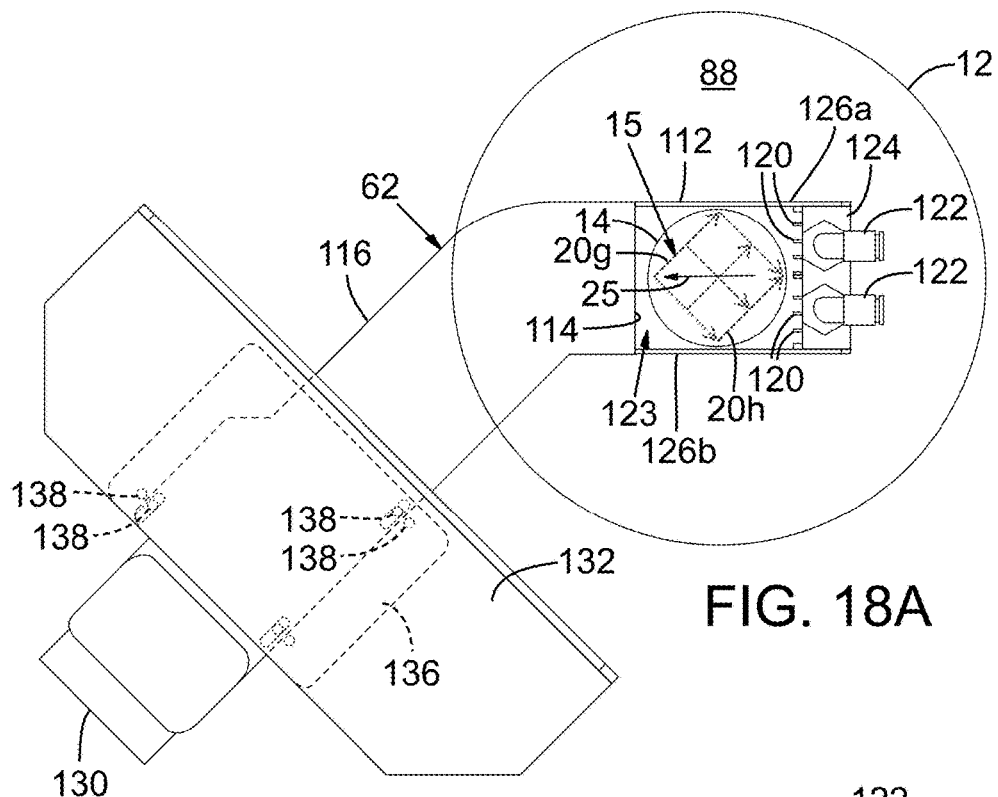
FIG. 18A is a simplified plan view of an exemplary embodiment of a gas flow assembly oriented over a scan field so that the cumulative gas flow is oriented obliquely to the intended scan paths.
Figure 18B:
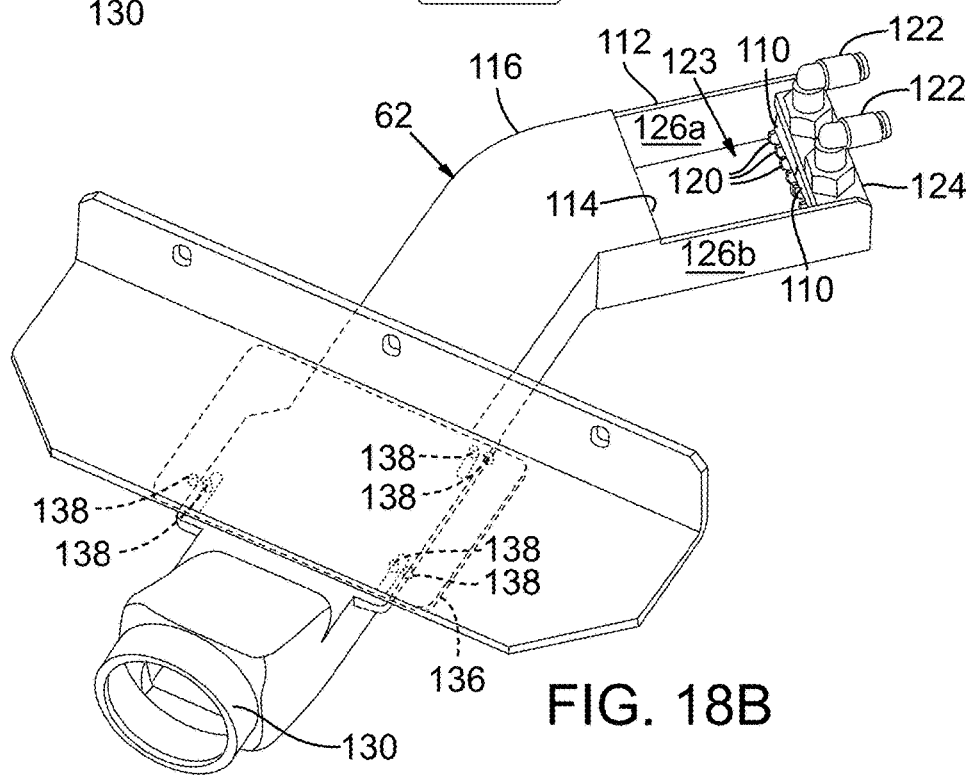
FIG. 18B is a top, rear, and right side isometric view of the gas flow assembly shown in FIG. 18A.
Figure 18C:
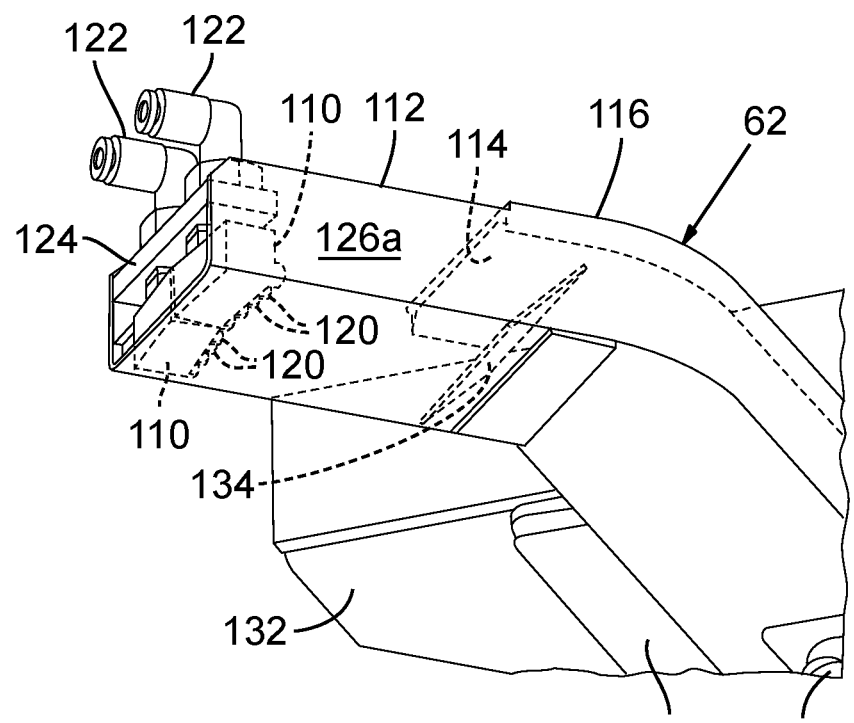
FIG. 18C is a bottom, front, and left side view of the gas flow assembly shown in FIG. 18A.

FIG. 18A is a simplified plan view of an exemplary embodiment of a gas flow assembly 62 oriented over a scan field 14 so that the cumulative gas flow is oriented obliquely to the intended scan paths 16. FIG. 18B is a top, rear, and right side isometric view of the gas flow assembly 62 shown in FIG. 18A. FIG. 18C is a bottom, front, and left side view of the gas flow assembly 62 shown in FIG. 18A. With reference to FIGS. 17, 18A, 18B, and 18C, the gas flow assembly 62 may include one or more gas injection devices 110, such as air knives, that may be positioned across a scan field frame 112 from an exhaust entrance port 114 of an exhaust conduit 116.

The gas injection devices 110 may employ a single nozzle 120 or multiple nozzles 120, which may be similarly oriented or differently oriented. Moreover, each nozzle 120 may provide the same gas pressure or velocity and air stream shape, or the nozzle 120 may provide different pressures or velocities and gas stream shapes. The nozzles 120 having these characteristics may be pre-established, or the nozzles 120 may be individually adjustable for pressure, velocity, and shape. Moreover, such individually controllable nozzles 120 can be controlled directly or indirectly by the controller 94. In some embodiments, the nozzles 120 are oriented to provide an average gas flow that it is relatively parallel to the surface 88 of the workpiece 12. In some embodiments, the nozzles 120 are oriented to provide a gas flow that it is at least partly directed toward the surface 88 of the workpiece 12. In some embodiments, the nozzles are adapted to provide gas flow components that fan toward from the surface 88 of the workpiece 12 and gas flow components that fan away from the surface 88 of the workpiece 12. The fanning angles do not need to be the same and can also be controlled directly or indirectly by the controller. Any variability or positional versatility built into the nozzles 120 can be controlled directly or indirectly by the controller 94.

The gas injection devices 110 may be fed by through gas input ports 122 via hoses or other conduits from a pressurized gas source (not shown). The pressure of air flowing through the gas input ports 122 can be controlled directly or indirectly by the controller 94. The velocity of gas supplied by the nozzles 120 can also impact waviness. In general, lower gas input velocity is better down to a nonzero value. Generally, in other words, a lower gas input velocities decrease the waviness. In some embodiments, the gas employed is one of nitrogen, oxygen, or air (which may be filtered) before fed through the gas input ports 122. It will be appreciated that that gas may include other compositions and that any type of fluid may be employed, such as a liquid or a gas.

The scan field frame 112 may physically connect a gas injection support structure 124, which supports the gas injection devices 110, to the exhaust entrance port 114 of the exhaust conduit 116. Generally, the scan field frame 112 defines an unobstructed gas flow field 123 that is greater than the area of the scan field 14 or greater than the area of the processing field 15. In some embodiments, one or more of the length and width dimensions of the scan field frame 14 (or gas flow field 123) are greater than a diagonal dimension of the processing field 15 or greater than the diameter or major axis of the scan field 14.

In some embodiments, the scan field frame 112 has no overlying top surface between edges 124a and 124b or bottom surface between 124c and 124d over the gas flow field 123 of the scan field frame 112. In some embodiments, however, the scan field frame 112 can employ a top cover surface between edges 124a and 124b if the surface is transparent to the wavelength of the laser beam. In some embodiments, the scan field frame 112 employs a side wall 126a between edges 124a and 124c and/or a side wall 126b between edges 124b and 124d.

In some embodiments, the predominant gas flow direction 25 is parallel to one or both of the side walls 126a and 126b, and the scan field frame 112 is positioned above the surface 88 of the workpiece 12 so that the streets of the workpiece 12 are oriented obliquely to the predominant gas flow direction 25. As noted earlier, the relative orientation can be achieved by orienting the streets of the workpiece 12 in a standard orientation with respect the processing field 15 and the laser micromachining system 60, and by orienting the gas flow assembly 62 (or particularly the scan field frame 112) so that it is oblique to the orientation of the streets of the workpiece 12. Alternatively, the gas flow assembly 62 (or particularly the scan field frame 112) can be oriented to be aligned with a standard orientation of the workpiece streets, but the workpiece 12 can be oriented so that its streets are obliquely oriented with respect to the standard orientation of the processing field 15.

In some embodiments, the exhaust conduit 116 may have a major axis that is generally parallel to the predominant gas flow direction 25. However, in some embodiments, the exhaust conduit 116 may have one or more angles between the exhaust entrance port 114 and an exhaust exit port 130 that may be directly or indirectly connected to a vacuum source (not shown). The amount of vacuum suction provided by the vacuum source may be controlled directly or indirectly by the controller 94. The gas flow assembly 62 can also employ optional blade valves or baffles 134 near the nozzles or within the exhaust conduit 116 to direct the gas flow and aid in debris removal.

The gas flow assembly 62 can be mounted to have independent movement with respect to the workpiece 12. In some embodiments, the gas flow assembly 62 can be attached by a mounting bracket 132 directly or indirectly (such as through a contact plate 136 by any type of connector such as tap screws 138) to a laser-scanning head (or fast positioner head) or an optical bench supporting the finishing optics (such as the scan lens 85) so that the gas flow field 123 can be easily moved in coordination with the movement of the laser scanning head and the start position of the laser beam axis 84 with respect to any given processing field 15. It will be appreciated that mounting bracket 132 can provide position adjustment between the scan field 14 and the scan field frame 112 and/or provide tip or tilt adjustment of the gas flow assembly 62 with respect to the surface 88 of the workpiece 12. It will also be appreciated that if the scan field 14 and the gas flow assembly 62 are independently moveable (during a processing run over an entire workpiece 12), then their relative movement or coordinated movement can be controlled directly or indirectly by the controller 94.

As noted earlier, the height or elevation of the exhaust entrance port 114 with respect to the surface 88 of the workpiece 12 can also impact waviness. In general, higher is better, up to a limit impacted by vacuum pull; force, angle, and height of introduced gas; and composition and chemical state of debris. In other words, an increase in the height elevation of the exhaust port 114 with respect to the surface 88 of the workpiece 12 can decrease the waviness observed. In some embodiments, the bottom of the gas flow assembly 62 (or the exhaust entrance port 114) can be in a range of 1 to 20 mm in elevation with respect to the surface 88 of the workpiece 12. In some embodiments, the bottom of the gas flow assembly 62 (or the exhaust entrance port 114) can be in a range of 2 to 10 mm in elevation with respect to the surface 88 of the workpiece 12. In some embodiments, the bottom of the gas flow assembly 62 (or the exhaust entrance port 114) can be in a range of 3 to 7 mm in elevation with respect to the surface 88 of the workpiece 12. In some embodiments, the bottom of the gas flow assembly 62 (or the exhaust entrance port 114) can be in a range of 4 to 6 mm in elevation with respect to the surface 88 of the workpiece 12. Of course, the elevation can be less than 1 mm or greater 20 mm with respect to the surface 88 of the workpiece 12. In some embodiments, the air nozzles 120 are positioned toward the bottom of the gas flow assembly 162 and are lower than the major portion of the cross-sectional area of the exhaust entrance port 114.

The foregoing is illustrative of only a few embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A method for enhancing an edge characteristic of a laser-induced material effect resulting from a laser scan across a workpiece, comprising:
  relatively orienting a laser processing field and the workpiece at a processing station of a laser processing system;
  establishing, from a gas supply, a gas input flow in a gas input direction across at least a portion of a major surface of the workpiece, wherein gas in the gas input flow has a positive gas input velocity in the gas input direction;
  establishing, from a vacuum source, a gas outtake flow in a gas outtake direction across at least the portion of the major surface of the workpiece, wherein the gas input flow and the gas outtake flow establish a predominant gas flow direction across at least the portion of the major surface of the workpiece; and
  while maintaining the gas input flow and the gas outtake flow, scanning a laser beam in a first laser scan direction of relative movement of a laser beam processing axis of the laser beam with respect to the workpiece, wherein the laser beam impinges the workpiece along the first laser scan direction, wherein the first laser scan direction is oriented obliquely opposite to the predominant gas flow direction.

2. The method of claim 1, wherein the laser-induced material effect forms elongated scan features along the first laser scan direction, wherein the elongated scan features exhibit a perpendicular width having a standard deviation of less than 0.5 microns.

3. The method of claim 1, wherein the laser-induced material effect forms a first scan feature along the first laser scan direction, wherein the first scan feature has opposing first primary and first secondary edges, wherein each of the edges can be expressed as a respective average straight fit line, wherein horizontal peaks and valleys of each edge can be expressed as absolute values with respect to the respective average straight fit line, wherein a standard deviation of the absolute values of each edge to its respective average straight fit line is less than 0.3 microns.

4. The method of claim 1, wherein scanning the laser beam in the first laser scan direction employs at least one selected from the group consisting of: a galvanometer-driven minor, a fast-steering minor, a rotating polygon scanner, and an acousto-optic device.

5. The method of claim 1, wherein the cumulative gas flow along the predominant gas flow direction is continuous during the step of scanning a laser beam in a first laser scan direction of relative movement.

6. The method of claim 1, wherein the laser beam processing axis moves within a scan field, wherein the scan field includes a laser processing field that is smaller than or equal in area to the scan field, wherein the cumulative gas flow along the predominant gas flow direction is maximized with respect to flow dynamics encompassing the processing field, and wherein a velocity of scanning the laser beam in the first scan direction is maximized with respect to a parameter recipe that achieves desirable quality of the laser induced effect.

7. The method of claim 1, wherein the step of scanning the laser beam in the first laser scan direction of relative movement comprises scanning the laser beam along multiple parallel scan paths in the first laser scan direction.

8. The method of claim 1, wherein the laser beam processing axis moves within a scan field, wherein the scan field includes a laser processing field that is smaller than or equal in area to the scan field, wherein the processing field has a rectangular perimeter, and wherein the first scan direction is parallel to a diagonal axis of the processing field.

9. The method of claim 1, wherein the laser beam processing axis moves within a scan field, wherein the scan field includes a laser processing field that is smaller than or equal in area to the scan field, wherein the processing field has a major axis dimension of a major axis that bisects the processing field, wherein the gas input direction is generally perpendicular to the major axis of the processing field, wherein a gas flow volume traveling along the gas input direction has a flow width dimension that is perpendicular to the gas input direction, and wherein the flow width dimension is greater than the major axis dimension.

10. The method of claim 1, wherein the workpiece includes one or more features having a feature orientation, wherein the processing station has a first processing station orientation with a first processing station axis and a second processing station axis that is orthogonal to the first processing station axis, wherein the laser beam processing axis moves within a scan field having a scan field orientation with a first scan field axis and a second scan field axis that is orthogonal to the first scan field axis, and wherein the feature orientation is oriented with respect to the processing station orientation or the scan field orientation.

11. The method of claim 1, further comprising, while maintaining the gas input flow and the gas outtake flow, scanning a laser beam in a second laser scan direction of relative movement of a respective laser beam processing axis with respect to the workpiece, wherein the second laser scan direction is obliquely oriented opposite to the predominant gas flow direction, wherein the second laser scan direction is transverse to the first laser scan direction.

12. The method of claim 11, wherein the second scan direction is orthogonal to the first scan direction.

13. The method of claim 11, wherein the first scan direction is at a 135°±5.125° angle with respect to the predominant gas flow direction.

14. The method of claim 13, wherein the second scan direction is at a 225°±5.125° angle with respect to the predominant gas flow direction.

15. The method of claim 11, wherein the predominant gas flow direction remains generally the same during scans along the first laser scan direction and the second laser scan direction.

16. The method of claim 11, wherein the laser beam processing axis is provided with continuous motion during and between the step of scanning a laser beam in the first laser scan direction of relative movement and the step of scanning the laser beam in the second laser scan direction.

17. The method of claim 11, wherein the laser beam processing axis moves within a scan field, wherein the step of scanning a laser beam in the first laser scan direction of relative movement and the step of scanning the laser beam in the second laser scan direction are each performed over multiple neighboring scan fields over the workpiece while maintaining the predominant gas flow direction of the gas input flow and the gas outtake flow.

18. The method of claim 11, wherein the workpiece includes one or more features having a feature orientation, wherein the processing station has a first processing station orientation with a first processing station axis and a second processing station axis that is orthogonal to the first processing station axis, wherein the laser beam processing axis moves within a scan field having a scan field orientation with a first scan field axis and a second scan field axis that is orthogonal to the first scan field axis, and wherein the feature orientation is oriented with respect to the processing station orientation or the scan field orientation, wherein the second scan direction is orthogonal to the first scan direction, wherein the first scan direction is at a 135°±11.25° angle with respect to the predominant gas flow direction, wherein the second scan direction is at a 225°±11.25° angle with respect to the predominant gas flow direction, wherein the predominant gas flow direction remains generally the same during scans along the first laser scan direction and the second laser scan direction, wherein the step of scanning the laser beam in the first laser scan direction of relative movement comprises scanning the laser beam along multiple parallel scan paths in the first laser scan direction before the step of scanning the same laser beam or a different laser beam in a second laser scan direction of relative movement, wherein the laser beam processing axis is provided with continuous motion during and between the steps of scanning a laser beam in a first laser scan direction of relative movement and scanning the same laser beam or a different laser beam in a second laser scan direction, wherein the laser-induced material effect forms a first scan feature along the first laser scan direction, wherein the first scan feature has opposing first primary and first secondary edges, wherein the laser-induced material effect forms a second scan feature along the second laser scan direction, wherein the second scan feature has opposing second primary and second secondary edges, wherein each of the edges can be expressed as a respective average straight fit line, wherein horizontal peaks and valleys of each edge can be expressed as absolute values with respect to the respective average straight fit line, and wherein a standard deviation of the absolute values of each edge to its respective average straight fit line is less than 0.3 microns.

19. A laser processing system for processing a workpiece having a major surface and one or more features formed on the major surface, wherein the major surface has a surface area, and wherein the laser processing system provides a processing field having a processing field orientation with a first processing field axis and a second processing field axis that is orthogonal to the first processing field axis, comprising:
  a processing station having a processing station orientation with a first processing station axis and a second processing station axis that is orthogonal to the first processing station axis;
  a chuck adapted for placing the workpiece in the processing station at which the workpiece is positionable so that at least one of the features is oriented with respect to the processing station orientation or the processing field orientation;
  a laser adapted for generating a laser beam;
  a beam positioning system including one or more stages for supporting the chuck or the workpiece, the beam positioning system also including a fast-positioner having a scan field that is smaller than the workpiece, wherein the laser processing field is within the scan field such that the laser processing field is smaller than or equal in area to the scan field, wherein the beam positioning system is adapted for positioning the processing field in multiple neighboring locations over the workpiece, and wherein the beam positioning system is adapted for scanning the laser beam along a laser beam processing axis to impinge the workpiece;
  a gas flow assembly that includes a gas input flow device adapted for establishing a gas input flow having a positive gas input velocity in a gas input direction across at least the processing field located over a portion of the major surface of the workpiece, wherein the gas flow assembly also includes a gas outtake port adapted for establishing a gas outtake flow in a gas outtake direction across at least the processing field located over the portion of the major surface of the workpiece, wherein the gas input flow and the gas outtake flow are adapted to establish a predominant gas flow direction across at least the processing field located over the portion of the major surface of the workpiece, and wherein the gas input flow and the gas outtake flow are adapted to cooperate to provide cumulative gas flow characteristics across at least the processing field located over the portion of the major surface of the workpiece; and
  a controller adapted to control, within the processing field and while maintaining the gas input flow and the gas outtake flow, scanning the laser beam in a first laser scan direction of relative movement of a laser beam processing axis of the laser beam with respect to the workpiece, such that the first laser scan direction is obliquely oriented opposite to the predominant gas flow direction and such that the laser beam impinges the workpiece along the first laser scan direction affecting the material along the first laser scan direction, wherein the controller is also adapted to control, within the processing field and while maintaining the gas input flow and the gas outtake flow, scanning the same laser beam or a different laser beam in a second laser scan direction of relative movement of a respective laser beam processing axis with respect to the workpiece, such that the second laser scan direction is obliquely oriented opposite to the predominant gas flow direction and such that the laser beam impinges the workpiece along the second laser scan direction affecting the material along the second laser scan direction, and wherein the second laser scan direction is transverse to the first laser scan direction.

20. A method for enhancing an edge characteristic of a laser-induced material effect resulting from transverse laser scans across a workpiece, comprising:
  relatively orienting a laser processing field and the workpiece at a processing station of a laser processing system;
  establishing, from a gas supply, a gas input flow in a gas input direction across at least a portion of a major surface of the workpiece, wherein gas in the gas input flow has a positive gas input velocity in the gas input direction;
  establishing, from a vacuum source, a gas outtake flow in a gas outtake direction across at least the portion of the major surface of the workpiece, wherein the gas input flow and the gas outtake flow establish a predominant gas flow direction across at least the portion of the major surface of the workpiece, and wherein the gas input flow and the gas outtake flow cooperate to provide a cumulative gas flow having a gas flow velocity across at least the portion of the workpiece;

while maintaining the gas input flow and the gas outtake flow, scanning a laser beam in a first laser scan direction of relative movement of a laser beam processing axis of the laser beam with respect to the workpiece, wherein the laser beam impinges the workpiece along the first laser scan direction affecting the material along the first laser scan direction and creating one or more localized adverse gas characteristics that could interfere with the capability of the laser beam to impinge the workpiece accurately with respect to a directed position of the laser beam processing axis along the first laser scan direction and could cause fluctuation of the edge characteristic of the laser-induced material effect, wherein the first laser scan direction is transverse to the predominant gas flow direction, wherein the first laser scan direction includes a first laser scan direction component that is parallel with and opposite to the predominant gas flow direction, and wherein the first laser scan direction with respect to the predominant gas flow direction inhibits the one or more localized adverse gas characteristics; and while maintaining the gas input flow and the gas outtake flow, scanning the same laser beam or a different laser beam in a second laser scan direction of relative movement of a respective laser beam processing axis with respect to the workpiece, wherein the laser beam impinges the workpiece along the second laser scan direction affecting the material along the second laser scan direction and creating one or more localized adverse gas characteristics that could interfere with the capability of the laser beam to impinge the workpiece accurately with respect to a directed position of the laser beam processing axis along the second laser scan direction and could cause fluctuation of the edge characteristic of the laser-induced material effect, wherein the second laser scan direction is transverse to the first laser scan direction, wherein the second laser scan direction is transverse to the predominant gas flow direction, wherein the second laser scan direction includes a second laser scan direction component that is parallel with and opposite to the predominant gas flow direction, and wherein the second laser scan direction with respect to the predominant gas flow direction inhibits the one or more localized adverse gas characteristics.

* * * * *